United States Patent
Wang et al.

(10) Patent No.: US 10,044,772 B2
(45) Date of Patent: *Aug. 7, 2018

(54) METHOD AND DEVICE FOR CONTENT SHARING

(71) Applicant: HUAWEI DEVICE CO., LTD., Shenzhen (CN)

(72) Inventors: Lei Wang, Beijing (CN); Wenmei Gao, Beijing (CN); Shunan Fan, Beijing (CN); Xiaoqiang Lv, Shenzhen (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/591,614

(22) Filed: May 10, 2017

(65) Prior Publication Data

US 2017/0244764 A1   Aug. 24, 2017

Related U.S. Application Data

(63) Continuation of application No. 14/075,383, filed on Nov. 8, 2013, now Pat. No. 9,686,321, which is a
(Continued)

(30) Foreign Application Priority Data

May 10, 2011   (CN) .......................... 2011 1 0120129

(51) Int. Cl.
*H04L 29/06*   (2006.01)
*H04L 29/08*   (2006.01)
(Continued)

(52) U.S. Cl.
CPC ...... *H04L 65/1069* (2013.01); *H04L 65/1006* (2013.01); *H04L 65/1063* (2013.01);
(Continued)

(58) Field of Classification Search
CPC ................................................. H04L 65/1069
(Continued)

(56) References Cited

U.S. PATENT DOCUMENTS

2009/0210536 A1   8/2009   Allen et al.
2010/0005517 A1   1/2010   Foti
(Continued)

FOREIGN PATENT DOCUMENTS

CN   101052044   10/2007
CN   101159850   4/2008
(Continued)

OTHER PUBLICATIONS

OIPF Feature Package: Content and Communication services to mobile/portable devices [V1.0], Open IPTV Forum, Jun. 6, 2012, pp. 1-35.
(Continued)

*Primary Examiner* — David Lazaro
*Assistant Examiner* — Zia Khurshid
(74) *Attorney, Agent, or Firm* — Staas & Halsey LLP

(57) ABSTRACT

Embodiments of the present invention relate to a method for content sharing, where the method includes: receiving a content share request, establishing a share session with a receiving terminal, and sharing session content, which is played on a first initiating terminal, with the receiving terminal; and receiving a state notification about transferring the played session content from the first initiating terminal to a second initiating terminal, and according to the state notification, ending the share session or continuing to share the session content continuously played on the second initiating terminal. According to the embodiments of the present invention, CoD content watched on the initiating terminal can be shared, and when transfer occurs between display terminals of the content share initiator, a content
(Continued)

share AS can perceive the transfer, and continuity of the share session can be ensured. The present invention further relates to a device for content sharing.

21 Claims, 19 Drawing Sheets

Related U.S. Application Data continuation of application No. PCT/CN2012/075298, filed on May 10, 2012.

(51) Int. Cl.
*H04N 21/4788* (2011.01)
*H04N 21/643* (2011.01)

(52) U.S. Cl.
CPC ........ *H04L 65/4084* (2013.01); *H04L 67/148* (2013.01); *H04N 21/4788* (2013.01); *H04N 21/64322* (2013.01)

(58) Field of Classification Search
USPC ....................................................... 709/227
See application file for complete search history.

(56) References Cited

U.S. PATENT DOCUMENTS

| | | |
|---|---|---|
| 2010/0064336 A1 | 3/2010 | Jin |
| 2010/0279670 A1 | 11/2010 | Ghai et al. |
| 2010/0312897 A1* | 12/2010 | Allen .................. H04L 12/1822 709/227 |
| 2011/0040836 A1 | 2/2011 | Allen et al. |
| 2012/0079120 A1* | 3/2012 | Foti .................... H04L 65/4092 709/227 |

FOREIGN PATENT DOCUMENTS

| | | |
|---|---|---|
| CN | 101257646 | 9/2008 |
| CN | 101883333 | 11/2010 |
| EP | 2 007 101 | 12/2008 |
| WO | 2010/136866 | 12/2010 |

OTHER PUBLICATIONS

Extended European Search Report dated Apr. 22, 2014 in corresponding European Patent Application No. 12782723.6, 9 pages.
OIPF Release 2 Specification vol. 4—Protocols [V2.1 (edit006)], Open IPTV Forum, Mar. 9, 2011, pp. 1-310.
Chinese Search Report issued Jun. 23, 2014 in corresponding Chinese Patent Application No. 2011101201292, 3 pages.
Chinese Office Action dated Jul. 1, 2014 in corresponding Chinese Patent Application No. 201110120129.2, 8 pages.
International Search Report and Written Opinion dated Aug. 16, 2012 in corresponding International Patent Application No. PCT/CN2012/075298, 12 pages.
International Search Report dated Aug. 16, 2012 in corresponding International Patent Application No. PCT/CN2012/075298, 4 pages.
Office Action dated Dec. 18, 2015 in related U.S. Appl. No. 14/075,383.
Final Office Action dated Jul. 5, 2016 in related U.S. Appl. No. 14/075,383.
Advisory Action dated Oct. 3, 2016 in related U.S. Appl. No. 14/075,383.
Notice of Allowance dated Feb. 14, 2017 in related U.S. Appl. No. 14/075,383.
U.S. Appl. No. 14/075,383, filed Nov. 8, 2013, Lei Wang et al., Huawei Device Co., Ltd.

* cited by examiner

METHOD AND DEVICE FOR CONTENT SHARING

CROSS-REFERENCE TO RELATED APPLICATIONS

This application is a continuation of U.S. patent application Ser. No. 14/075,383, filed on Nov. 8, 2013, which is a continuation of International Application No. PCT/CN2012/075298, filed on May 10, 2012. The International Application claims priority to Chinese Patent Application No. 201110120129.2, filed on May 10, 2011. All of the aforementioned applications are hereby incorporated by reference in their entireties.

FIELD OF THE INVENTION

The present invention relates to the Internet Protocol Television field, and in particular, to a method and device for content sharing in an Internet Protocol Television.

BACKGROUND OF THE INVENTION

IPTV (Internet Protocol Television) Internet Protocol Television, generally referred to as an interactive Web television, is a manageable multimedia service such as television/video/text/graphics/data delivered over an IP network to provide QoS (quality of service)/quality of experience (QoE), security, interactivity, and reliability. The IPTV technology integrates multiple technologies such as Internet, multimedia, and communication, uses a broadband network as an infrastructure, uses a home television set, a personal computer, a mobile phone, and so on as main display terminals, and provides multiple interactive multimedia services including digital television programs to a user through an IP protocol. The IPTV is mainly characterized in that it changes the traditional one-way broadcast media transmission manner, enables the user to receive media on demand, and implements real-time interaction between the user and the media content provider, thus better satisfying personalized requirements of the user.

A video share (Video Share) service refers to a video share service initiated by the user to the peer in a call process. The shared object may be a video collected in real time by a mobile terminal through a camera, or may be a video clip file stored on the terminal. In the call process, the user may randomly initiate and terminate the service.

Later, the share technology is extended. Shared content is not limited to videos, and discrete media may also be shared, which are collectively referred to as content share (Content share).

Normally, content is shared through the following process:

(1-2) A share initiating terminal initiates an INVITE request, where the INVITE request indicates the media type to be used. The request is forwarded to a share receiver through an application server (Application Server, "AS"). An Accept-Contact header field carries a "+g.3gpp.cs-voice" feature identifier, indicating that a video share service is initiated.

(3-5) A share receiving terminal receives the INVITE request of the share initiator, and sends a 183 message to the AS, where SDP information in the message includes a media stream type and encoding manner that are received by the receiving terminal. The AS sends a PRACK message to the share receiving terminal after receiving the 183 message, and the share receiving terminal sends a 200 OK response with respect to the PRACK.

(6-8). The AS sends a 183 request to the share initiating terminal; the share initiating terminal sends a PRACK message to the AS after receiving the 183 message; the AS sends a 200 OK response with respect to the PRACK. There is no time sequence for this step and steps (3-5).

(9-10) After reserving resources successfully, the share initiating terminal sends an UPDATE message to notify the share receiving terminal.

(11-12) The share receiving terminal receives the UPDATE message, and sends a 200 OK response message to the share initiator after the resources of the share receiving terminal are reserved successfully.

(13-14) The share receiving terminal sends a 180 message to the share initiating terminal, and prompts that the share receiving terminal has received the request message.

(15-16) The share receiver user accepts sharing, and the share receiving terminal sends a 200OK message to respond to the INVITE message.

(17-18) The share initiating terminal sends an ACK message to acknowledge session establishment. The share initiating terminal shares a real-time video through an RTP packet.

(19-20) A share terminal sends a BYE message to end video share.

(21-22) The terminal receiving the BYE message sends a 200 OK response with respect to the BYE message.

From the perspective of service use, the content share performed in the IPTV system should support the solution for sharing a program watched on the current device. However, the solution of the prior art does not provide a solution for sharing content on demand (Content on Demand, "CoD") currently watched by the user. Meanwhile, for a program being watched, and especially for a CoD program, the program may be switched between different terminals due to requirements of the user (for example, the user watches the program at home, and transfers the program to a mobile phone, or vice versa). The prior art may satisfy session continuity when watched IPTV content is switched between different terminals. However, if the user shares the IPTV content watched on a current terminal, in the prior art, the content share AS cannot perceive session transfer, that is, when session transfer occurs on the content share sender, because what concerns the content share AS is the initiating terminal specified when the content share is initiated, the information obtained by the content share AS is that the terminal where the shared content is located quits the watched program (actually, the user of the content share initiator does not quit the program), and therefore, the share operation to the peer is also terminated. As a result, the share session is interrupted and cannot be continued with the program operation of the player after transfer.

SUMMARY OF THE INVENTION

Embodiments of the present invention provide a method, device, and system for content sharing in an Internet Protocol Television, so that a user may flexibly terminate a share session or continue to share content when session transfer occurs on the content share sender.

According to an embodiment of the present invention, a method for content sharing in an Internet Protocol Television includes:

receiving a content share request, establishing a share session with a receiving terminal, and sharing session content, which is played on a first initiating terminal, with the receiving terminal; and receiving a state notification about transferring the played session content from the first initiating terminal to a second initiating terminal, and according to the state notification, ending the share session or continuing to share the session content continuously played on the second initiating terminal.

According to an embodiment of the present invention, a system for content sharing is provided. The system includes: a content share application server, configured to receive a content share request, establish a share session with a receiving terminal, and share session content, which is played on a first initiating terminal, with the receiving terminal; and an Internet Protocol Television control device, configured to transfer the session content, which is played on the first initiating terminal, to a second initiating terminal for continuously playing, and send a state notification about transferring the played session content from the first initiating terminal to the second initiating terminal; where the content share application server is further configured to receive the state notification about transferring the played session content from the first initiating terminal to the second initiating terminal, and according to the state notification, end the share session or continue to share the session content continuously played on the second initiating terminal.

According to an embodiment of the present invention, a content share application server is provided. The content share application server includes a sharing module, configured to receive a content share request, establish a share session with a receiving terminal, and share session content, which is played on a first initiating terminal, with the receiving terminal; and a controlling module, configured to receive a state notification about transferring the played session content from the first initiating terminal to a second initiating terminal, and according to the state notification, end the share session or continue to share the session content, which is continuously played on the second initiating terminal, with the receiving terminal.

According to the embodiments of the present invention, CoD content watched on the initiating terminal can be shared, and when transfer occurs between display terminals of the content share initiator, a content share AS can perceive the transfer, and continuity of the share session can be ensured.

Solutions of the embodiments of the present invention can ensure that the content shared later is consistent with the operation of the initiating terminal after transfer (for example, the share receiver can perform a synchronous operation after a new terminal changes a channel). Therefore, the content share service in the IPTV is not affected by session transfer of the share display terminal.

BRIEF DESCRIPTION OF THE DRAWINGS

To describe the technical solutions in the embodiments of the present invention more clearly, the following briefly introduces the accompanying drawings needed for describing the embodiments or the prior art. Apparently, the accompanying drawings in the following description show merely some embodiments of the present invention, and persons of ordinary skill in the art may still derive other drawings from these accompanying drawings without creative efforts. In the drawings.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

It should be noted that the IPTV terminal function device (IPTV Terminal Function, "ITF") in all embodiments of the present invention is equivalent to an open IPTV terminal function device (Open IPTV Terminal Function, "OITF")+ an IP multimedia subsystem gateway (IP Multimedia Subsystem Gateway, "IG"), or equivalent to an IP multimedia subsystem (IP Multimedia Subsystem, "IMS") or Session Initiation Protocol (Session Initiation Protocol, "SIP") terminal device (such as a mobile phone); therefore, the ITF related solution in the embodiments of the present invention is also applicable to IMS/SIP terminals such as a mobile phone. SIP messages in all embodiments of the present invention are forwarded through a logical SIP proxy server (SIP proxy) (a call session control function in the IMS (Call Session Control Function, "CSCF") device, and an authentication and session management (Authentication and Session Management, "ASM") device in the IPTV), which are basic message forwarding functions understandable to persons of ordinary skill in the art and therefore are not further described here.

Figure 1:
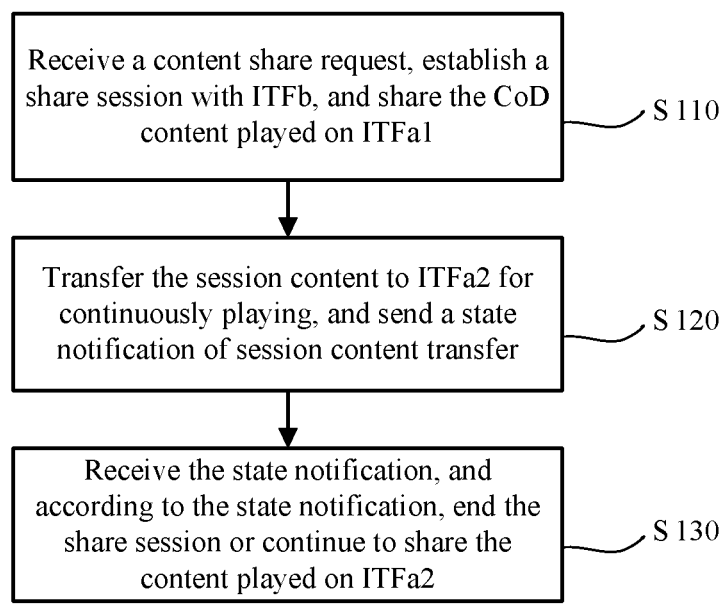
FIG. 1 is a flowchart of Embodiment 1 of the present invention.
Figure 2:
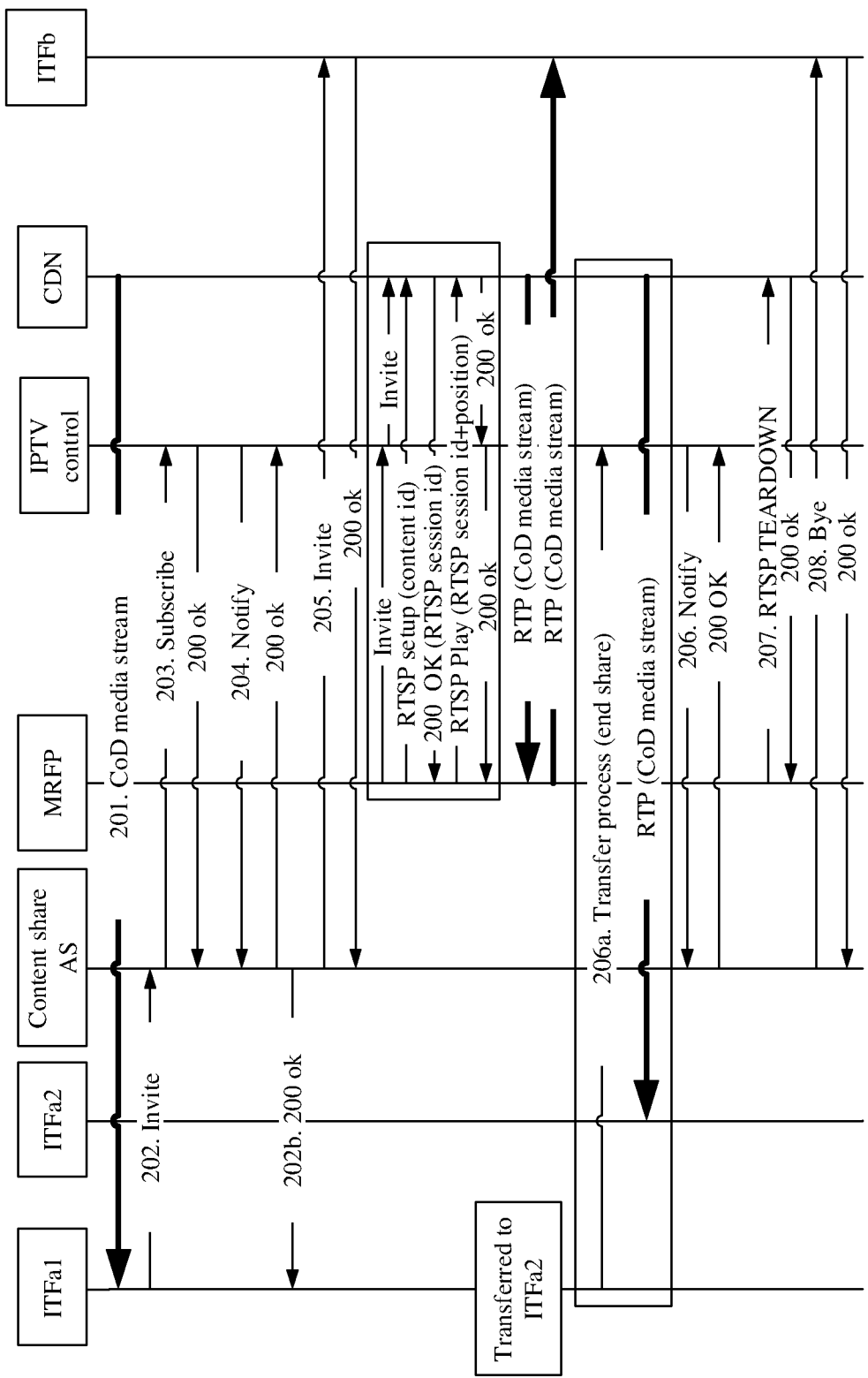
FIG. 2 is a time sequence diagram of Embodiment 1 of the present invention.

FIG. 1 is a flowchart of Embodiment 1 according to the present invention. FIG. 2 is a time sequence diagram of Embodiment 1 according to the present invention. The specific implementation process of the first embodiment of the present invention is described in detail in combination with FIG. 1 and FIG. 2.

In Embodiment 1 shown in FIG. 1, in step S110, the network side receives a content share request (SIP invite invite message), establishes a share session with a receiving terminal ITFb, and shares the session content, which is played on a first initiating terminal ITFa1, with the receiving terminal. In a specific embodiment of the present invention, as shown in FIG. 2, step S110 may include:

201. User A uses a terminal device ITFa1 to watch CoD media content.

202. User A uses a terminal device ITFa1 to send an Invite message to a content share application server (content share AS), where the message carries an indication indicating that the CoD media content being watched on the terminal device ITFa1 is shared.

203. The content share application server (content share AS) sends a subscription message to an IPTV control (IPTV control) device, subscribing to the content being watched on the terminal device ITFa1.

204. The IPTV control (IPTV control) device notifies the content share application server (content share AS) of the content information of the CoD currently watched on ITFa1 (for example, Bookmark information including a content identifier and the currently watched program position).

205. The content share application server (content share AS) sends an Invite message to the terminal ITFb of user B, initiating a content share session invitation.

When or before or after receiving a response from the ITFb terminal, the content share application server (content share AS) controls the corresponding media resource function processor (Media Resource Function processor, "MRFP") to access, according to the content information of the CoD currently watched on ITFa1 (for example, Bookmark information including a content identifier and the currently watched program position), the CoD media content currently watched on ITFa1, and after receiving a response (200 ok) from the ITFb terminal, forwards the CoD media (RTP stream in FIG. 2) to the ITFb.

In Embodiment 1 shown in FIG. 1, in step S120, the network side transfers the session content played on the first initiating terminal ITFa1 to a second initiating terminal ITF2 for continuously playing, and sends a state notification about transferring the played session content from the first initiating terminal ITFa1 to the second initiating terminal ITF2. In a specific embodiment of the present invention, as shown in FIG. 2, step S120 may include:

206a. Perform session transfer. The content watched on ITFa1 is transferred to ITFa2, and it is indicated, in the transfer process, that the media content watched on ITFa2 is not shared any longer; afterward, user A uses ITFa2 to watch CoD content (as shown in FIG. 2, the RTP stream is directed to ITFa2).

206b. The IPTV control (IPTV control) notifies the content share application server (content share AS) that the content on ITFa1 is transferred and that the content is no longer shared.

In Embodiment 1 shown in FIG. 1, in step S130, the network side receives a state notification about transferring the played session content from the first initiating terminal ITFa1 to the second initiating terminal ITF2, and according to the state notification, ends the share session or continues to share the session content continuously played on the second initiating terminal. In Embodiment 1, the network side ends the content share session. In a specific embodiment of the present invention, as shown in FIG. 2, step S130 may include:

207. The content share AS controls the corresponding media resource function processor MRFP (Media Resource Function processor) to quit the CoD session.

208. The content share AS ends the share session with the peer (ITFb).

In an alternative embodiment, with respect to the scenario where the terminal ITFa1 requests to quit the share during transfer, in the transfer process in FIG. 2, ITFa1 actively sends a bye message to the content share AS, triggering termination of the share session.

In the above step 206a, session transfer is performed, and the content watched on ITFa1 is transferred to ITFa2, and it is indicated, in the transfer process, that the process of sharing the media content watched on ITFa2 is not continued any longer, which may be completed by a 3GPP media transfer process (specifications 23.237 and 24.237d).

Before the transfer, all registered devices of the user need to be discovered by using a 3GPP dynamic device discovery process. The 3GPP dynamic device discovery process allows the user to discover all registered terminals with all user identities in the same subscription.

Figure 3:
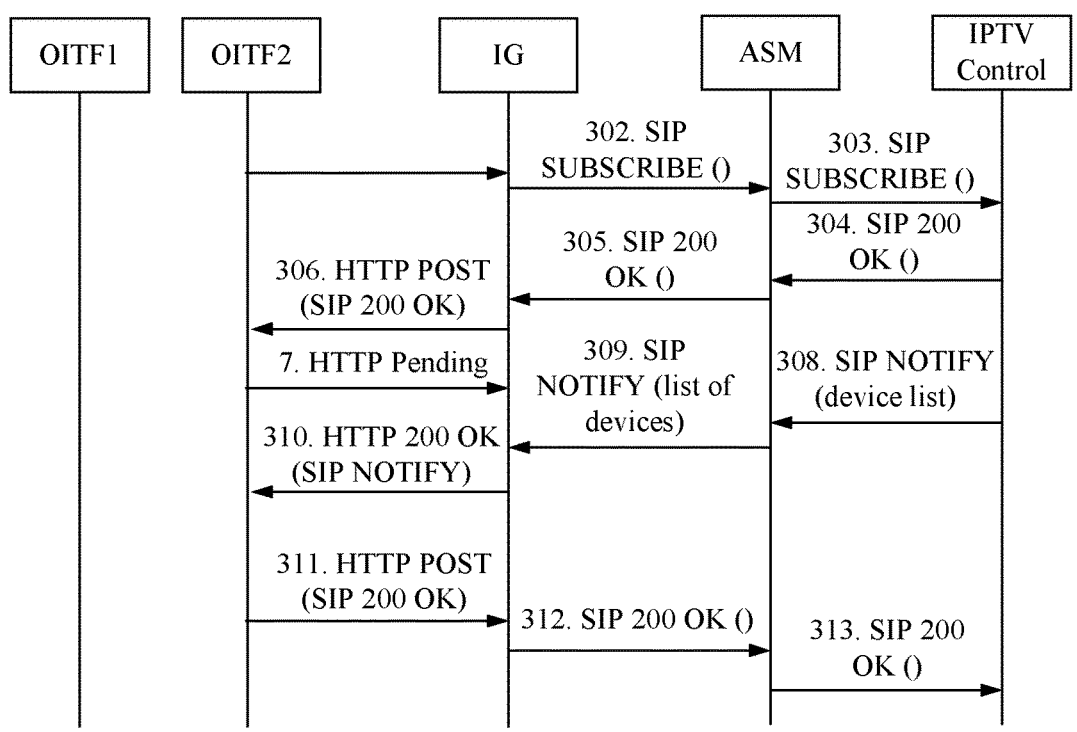
FIG. 3 is a time sequence diagram of a 3GPP dynamic device discovery process.

FIG. 3 is a time sequence diagram of a 3GPP dynamic device discovery process. Specifically:

301. OITF2 initiates an HTTP POST message to an IG, where the HTTP POST message includes a SIP SUBSCRIBE registration event package (SIP SUBSCRIBE Registration event package), where the registration is directed to an IPTV control function device (IPTV Control FE).

302. The IG forwards the SIP SUBSCRIBE registration event package to the authentication and session management unit (Authentication and Session Management, "ASM").

303. The ASM forwards the SIP SUBSCRIBE registration event package to the IPTV Control FE.

304. The IPTV Control FE returns a SIP 200 OK to the ASM.

305. The ASM forwards the SIP 200 OK to the IG.

306. The IG returns an HTTP 200 OK message including a SIP 200 OK response to OITF2.

307. OITF2 initiates an HTTP Pending IG request.

308. The IPTV Control generates a SIP NOTIFY message, where the SIP NOTIFY message includes all registered terminals with all user identities in the same IPTV subscription, and the IPTV Control sends the SIP NOTIFY to the ASM.

309. The ASM forwards the SIP NOTIFY to the IG.

310. The IG returns an HTTP 200 OK message including a SIP NOTIFY to OITF2.

311. OITF2 initiates an HTTP POST including a SIP 200 OK to the IG, so as to respond to the IG and indicate that the SIP NOTIFY is received.

312. The IG forwards the SIP 200 OK to the ASM.

313. The ASM forwards the SIP 200 OK to the IPTV Control.

It should be understood that the logical function of the ASM is the same as the call session control function of the IMS (call session control function, "CSCF") or SIP proxy. The logical function is mainly to implement authentication (when required) and SIP message forwarding (as shown in FIG. 3). In the solution of the present invention, the CSCF device is omitted. It should be noted that all SIP messages are forwarded through the ASM. It should be understood by persons of ordinary skill in the art that in international specifications such as 3GPP specifications, in the case of forwarding without specific processing, the CSCF is usually omitted in the description of the solution.

It should be understood by those skilled in the art that all SIP messages in the embodiments of the present invention are forwarded through the ASM.

Figure 4:
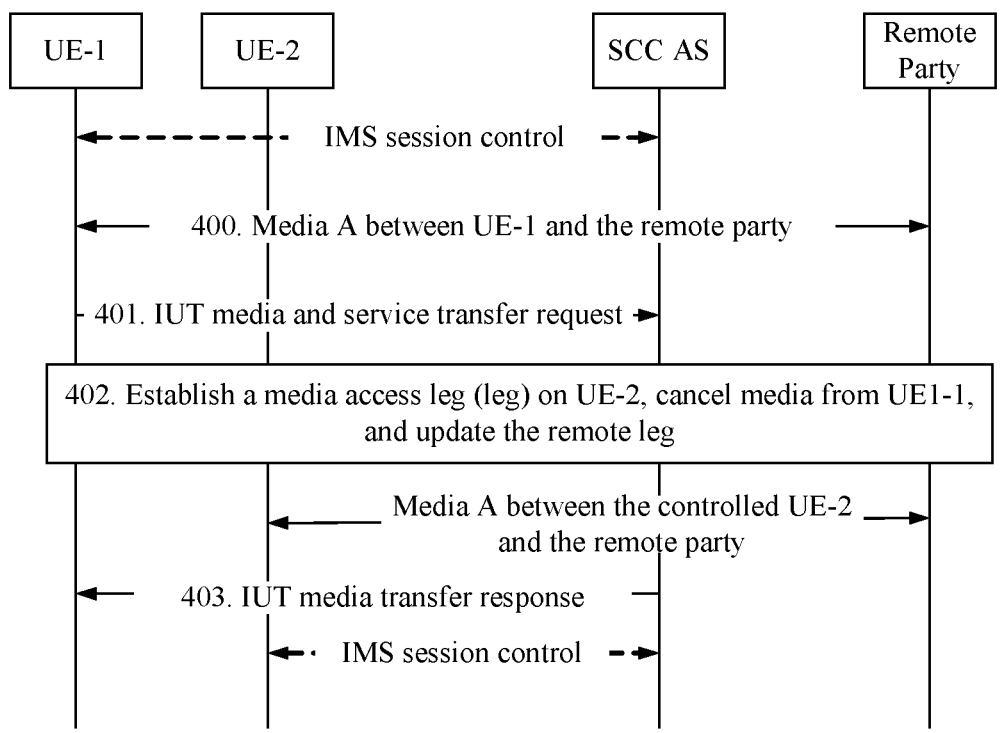
FIG. 4 is a time sequence diagram of media transfer in 3GPP.

FIG. 4 shows a time sequence diagram of media transfer in 3GPP, specifically:

400. UE1 performs a media session with an SCC AS.

401. UE-1 sends a media and service transfer request to the SCC AS, requesting to transfer media from UE1 to UE2.

402. The SCC AS establishes a media session with UE-2, and updates a remote leg.

403. The SCC AS releases the session with UE1.

According to a preferred embodiment, the present invention may use a SIP REFER message to transfer the content watched on ITFa1 to ITFa2.

Figure 5:
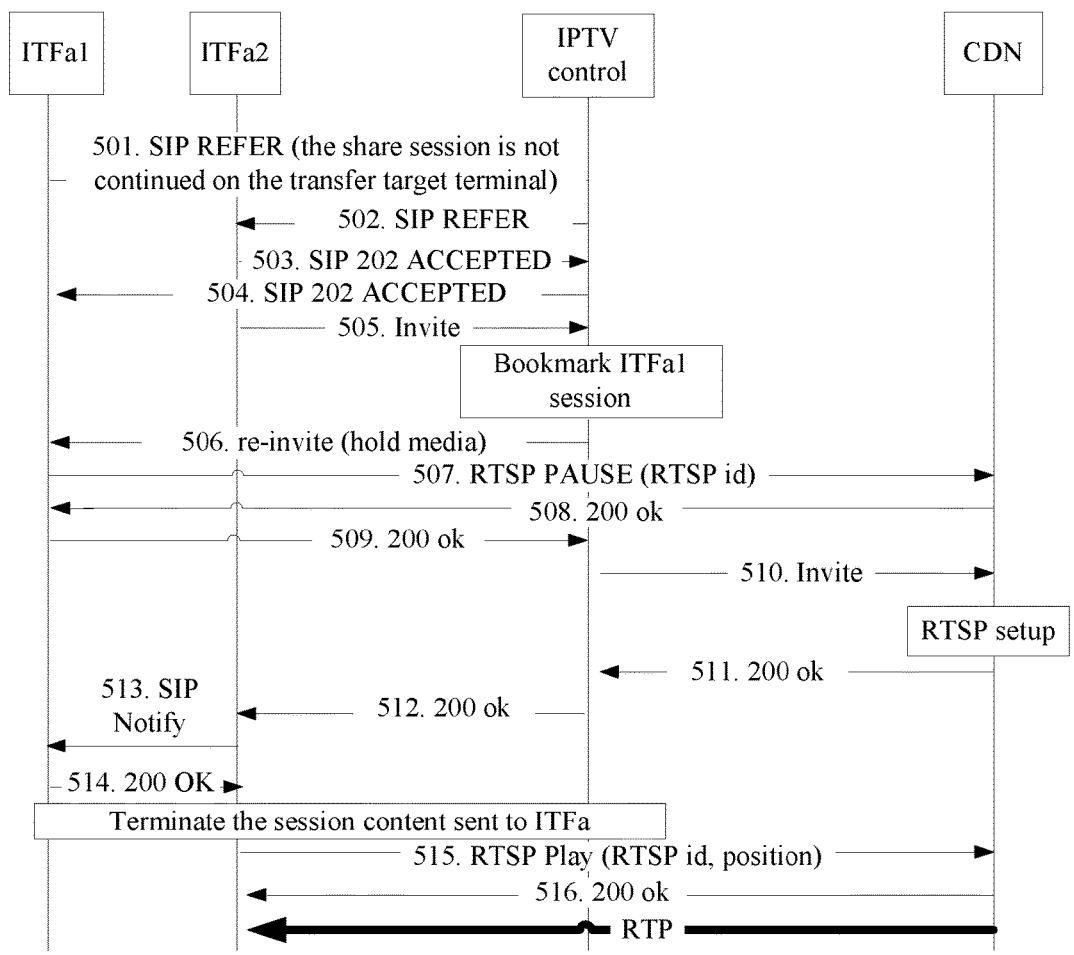
FIG. 5 is a time sequence diagram of transferring content watched on ITFa1 to ITFa2 by using a SIP REFER message.

FIG. 5 is a time sequence diagram of transferring content watched on ITFa1 to ITFa2 by using a SIP REFER message, specifically:

501. ITFa1 sends a SIP REFER message to the IPTV Control; in an embodiment of the present invention, the SIP REFER message is extended so that it may indicate whether to continue to share the content on a new terminal.

502. The IPTV Control sends a SIP REFER message to ITFa2.

503. ITFa1 returns a SIP 202 ACCEPTED.

504. The IPTV Control forwards the SIP 202 ACCEPTED to ITFa1.

505. ITFa2 sends an Invite message to the IPTV Control.

506. The IPTV Control sends a re-invite message to ITFa1 to hold the media.

507. ITFa1 sends an RTSP PAUSE message carrying an RTSP id to a CDN (content delivery network).

508. The CDN returns a 200 ok message.

509. ITFa1 forwards the 200 ok message to the IPTV Control.

510. The IPTV Control sends an Invite message to the CND.

511. The CDN returns a 200 ok message.

512. The IPTV Control forwards the 200 ok to ITFa2.

513. ITFa2 sends a SIP Notify notification to ITFa1.

514. ITFa1 returns a 200 ok.

515. ITFa2 sends an RTSP Play message to the CDN, where the message carries an RTSP id and a position identifier.

516. The CDN returns a 200 ok message to ITFa2.

In the present invention, the SIP REFER message is extended to indicate whether to continue to share the content on the new device, namely, ITFa2. The message is sent to the IPTV control. Therefore, the IPTV control may learn whether to continue to share the content, and sends a Notify notification of the corresponding content to the Content share AS. According to an exemplary embodiment, if the default is not continuing, the message does not need to be extended. Depending on different network resource conditions, the process of terminating (tear down) the session to ITFa1 may be executed after step 514 or step 511.

Figure 6:
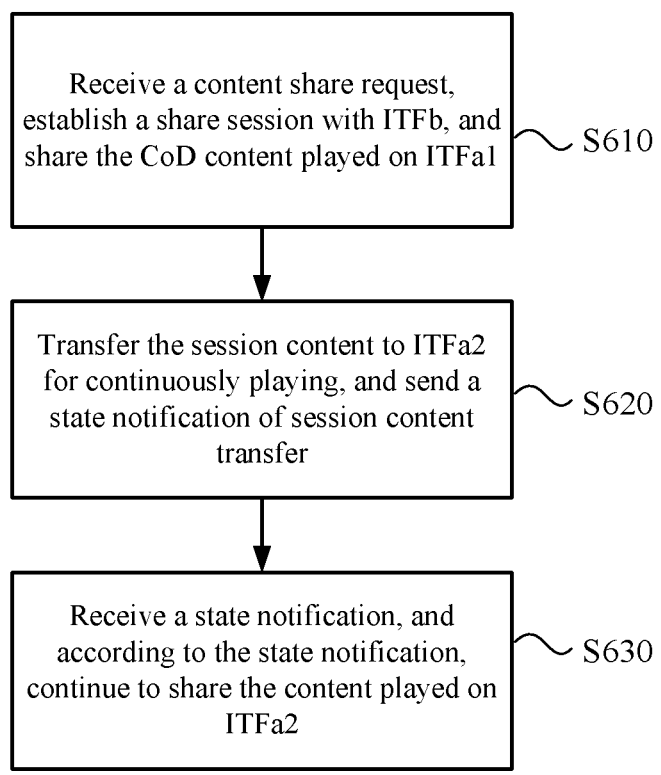
FIG. 6 is a flowchart of Embodiment 2 of the present invention.
Figure 7A:
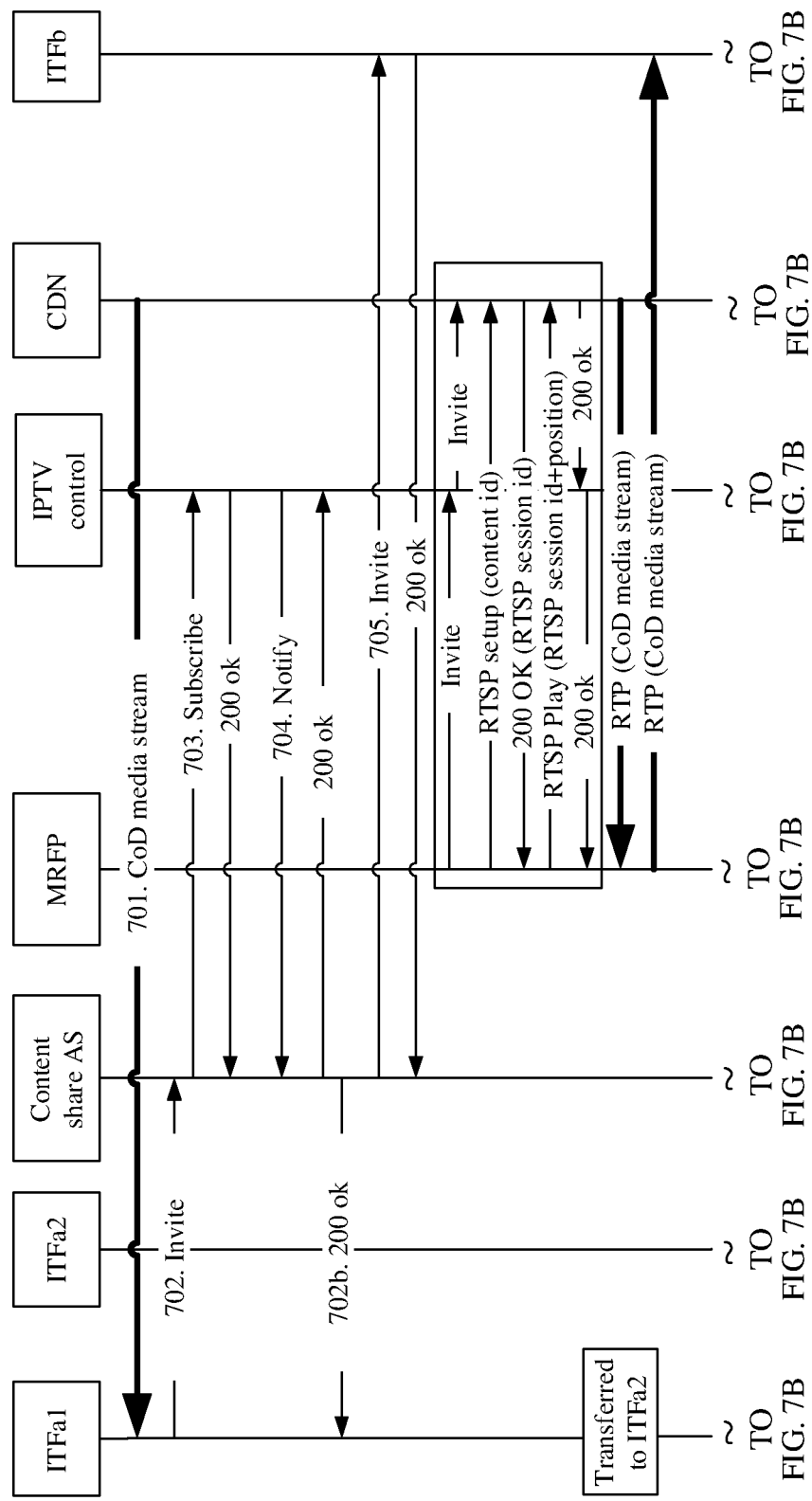
FIG. 7A and FIG. 7B are a time sequence diagram of Embodiment 2 of the present invention.
Figure 7B:
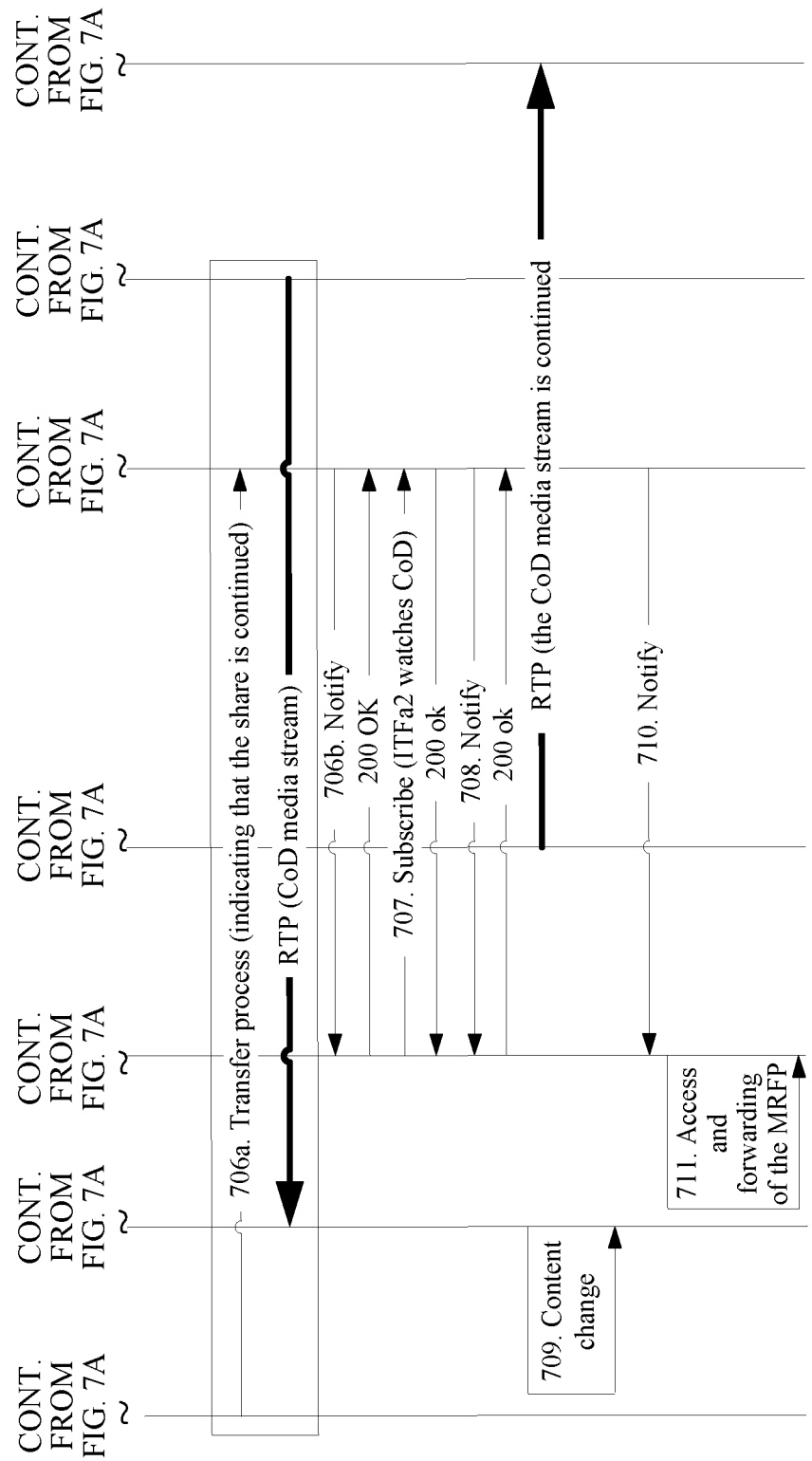

FIG. 6 is a flowchart of Embodiment 2 according to the present invention. FIG. 7A and FIG. 7B are a time sequence diagram of a specific implementation of the second embodiment according to the present invention. The difference between Embodiment 2 and Embodiment 1 lies in that the session content played on ITFa2 continues to be shared after the session content is transferred from ITFa1 to ITFa2. Therefore, step S610 of the method of Embodiment 2 is basically similar to step S110 of Embodiment 1, and is not further described here.

The following specifically describes the difference between Embodiment 2 and Embodiment 1 in combination with FIG. 6 and FIG. 7A and FIG. 7B, that is, in step S620, the session content played on the first initiating terminal ITFa1 is transferred to a second initiating terminal ITF2 for continuously playing, and a state notification about transferring the played session content from the first initiating terminal ITFa1 to the second initiating terminal ITF2 is sent. Different from step S120, the state notification indicates that the CoD content played on ITFa2 continues to be shared.

Specifically, in an embodiment of the present invention, step S610 includes basically the same content as step S110. As shown in FIG. 7A and FIG. 7B, step S610 includes steps 701 to 705, and steps 701 to 705 in FIG. 7A and FIG. 7B are basically the same as steps 201 to 205 in FIG. 2.

Step S620 may include:

706a. Perform session transfer. The content watched on ITFa1 is transferred to ITFa2, and it is indicated, in the transfer process, that the media content watched on ITFa2 continues to be shared; afterward, user A uses ITFa2 to watch CoD content (as shown in FIG. 6, the RTP stream is directed to ITFa2).

706b. The IPTV control (IPTV control) device notifies the content share application server (content share AS) that the content on ITFa1 is transferred and that the content on ITFa2 continues to be shared.

In Embodiment 2, in step S630, the network side receives a state notification about transferring the played session content from the first initiating terminal ITFa1 to the second initiating terminal ITF2, and according to the state notification, ends the share session or continues to share the session content continuously played on the second initiating terminal. In the embodiment shown in FIG. 7A and FIG. 7B, the content played on ITFa2 continues to be shared. In an embodiment of the present invention, as shown in FIG. 7A and FIG. 7B, step S630 includes:

707. The content share application server (content share AS) sends a subscription message to the IPTV control (IPTV control) device, subscribing to the content information being watched on the terminal device ITFa2.

708. The IPTV control (IPTV control) device notifies the content share application server (content share AS) of the content information of CoD currently watched on ITFa2 (for example, Bookmark information including a content identifier and the currently watched program position); according to the normal scenario setting of session transfer, in the process, content of ITFa2 and ITFa1 is continuous. Therefore, in the process, no change occurs when the MRFP accesses the media and shares the media with the peer.

709. A content change operation occurs on ITFa2 (for example, the user performs channel switching).

710. The IPTV control (IPTV control) notifies the content share application server (content share AS) of the content information currently watched on ITFa2 (for example, bookmark (Bookmark) information including a content identifier and the currently watched program position when content on demand (Content on Demand, "CoD"), and the channel number when Schedule (Schedule)).

711. The content share application server (content share AS) controls the corresponding media resource function processor MRFP (Media Resource Function processor) to access, according to the content information currently watched on ITFa2 after the change (for example, Bookmark information including a content identifier and the currently watched program position when CoD, and the channel numberwhen Schedule), the media stream, and forwards the content information to the peer (ITFb).

Similar to Embodiment 1, in the above step 706*a*, session transfer is performed, and the content watched on ITFa1 is transferred to ITFa2, and it is indicated, in the transfer process, that the process of sharing the media content watched on ITFa2 is continued, which may be completed by a 3GPP dynamic device discovery process (specifications 23.237 and 24.237).

Similar to the exemplary embodiment of Embodiment 1, Embodiment 2 may also use a SIP REFER message to transfer the content watched on ITFa1 to ITFa2. The SIP REFER message is extended to indicate that content on ITFa2 continues to be shared. If the default is continuing to share content, the SIP REFER message may not be extended.

The difference between Embodiment 2 and Embodiment 1 further lies in that, as shown in steps 709 to 711 in FIG. 7A and FIG. 7B, ITFa2 may notify the Content share AS of session transfer to change the signaling control terminal of the content share session, that is, both the media and the session are transferred.

As seen from FIG. 2 and FIG. 7A and FIG. 7B, the session transfer process is a relatively independent process, and has no necessary order with other content in the embodiment of the present invention.

Figure 8:
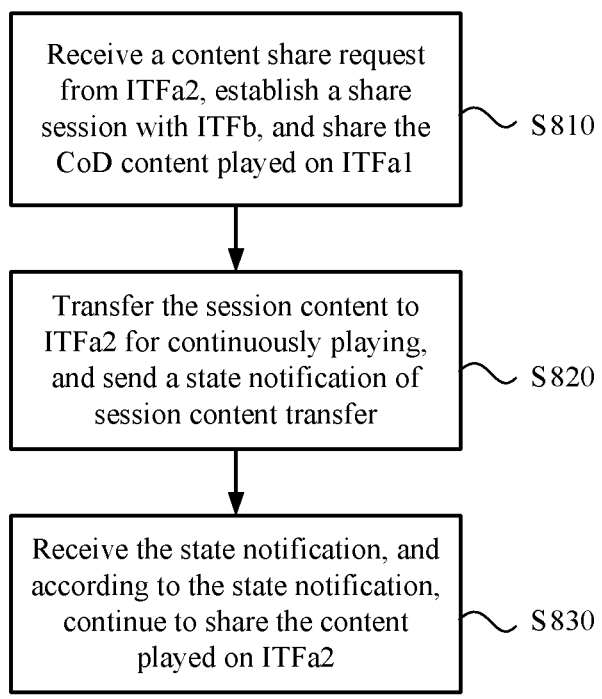
FIG. 8 is a flowchart of Embodiment 3 of the present invention.
Figure 9A:
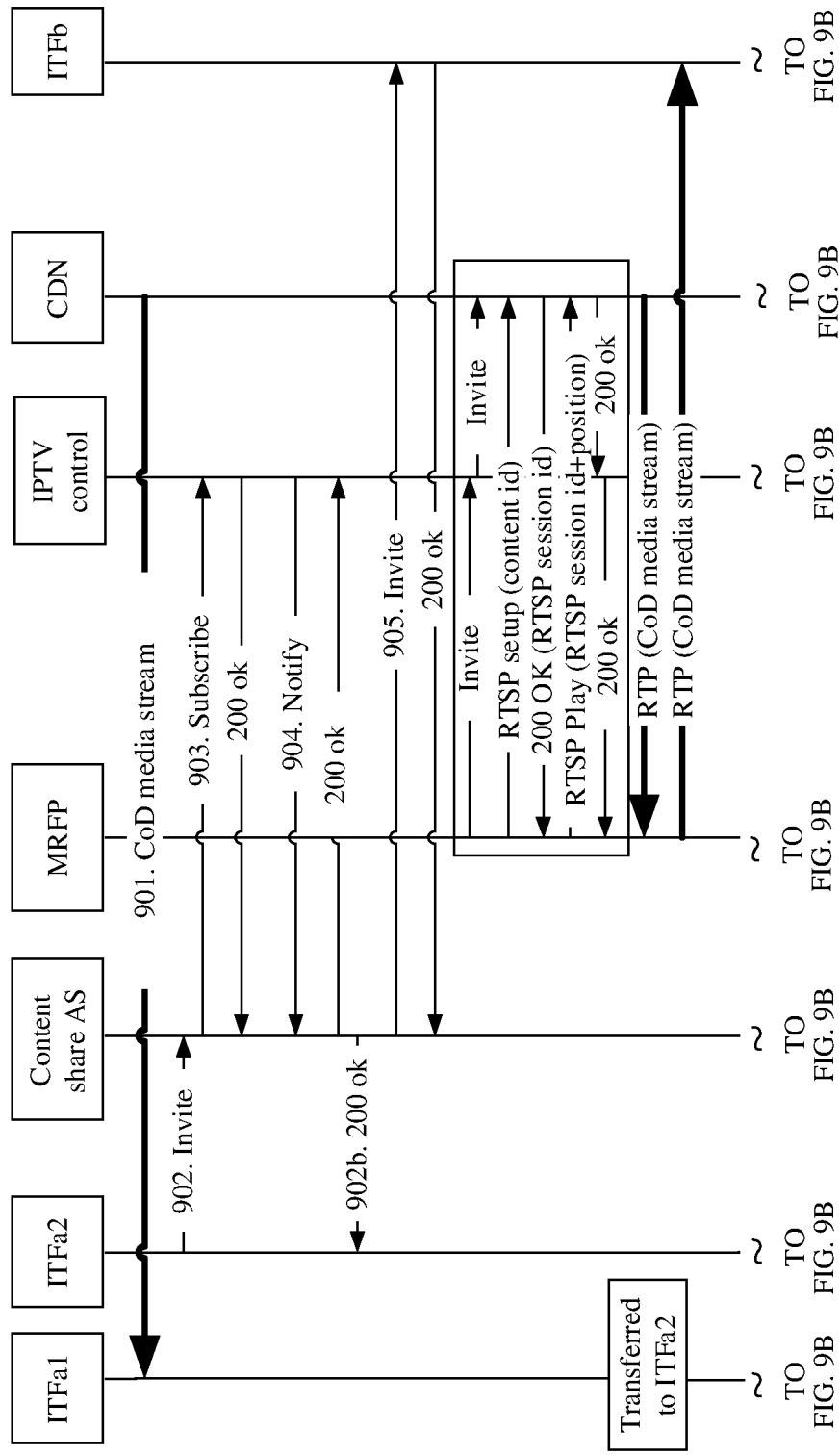
FIG. 9A and FIG. 9B are a time sequence diagram of Embodiment 3 of the present invention.
Figure 9B:
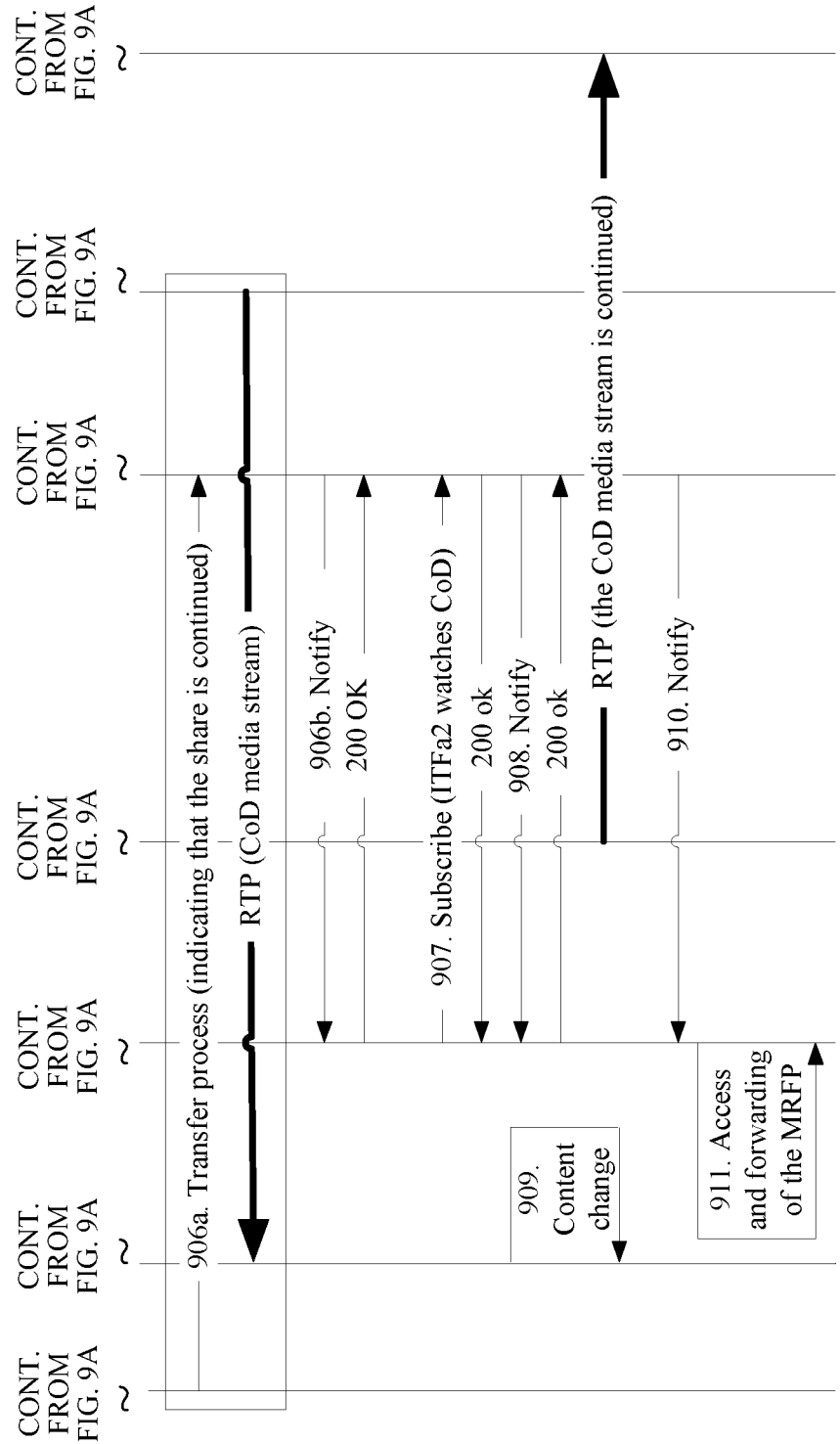

FIG. 8 is a flowchart of Embodiment 3 according to the present invention. FIG. 9A and FIG. 9B are a time sequence diagram of Embodiment 3 according to the present invention. Embodiment 3 is basically the same as Embodiment 2, and the difference is that in Embodiment 3, user A uses IFTa2 to send an Invite message to the Content share AS, indicating the shared CoD media content being watched on ITFa1.

In combination with FIG. 8 and FIG. 9A and FIG. 9B, the method of Embodiment 3 includes:

In step S810, the network side receives a content share request (SIP invite invite message), establishes a share session with a receiving terminal ITFb, and shares the session content played on a first initiating terminal ITFa1 with the receiving terminal, where the share request is an Invite message from ITFa2.

In step S820, the network side transfers the session content, which is played on the first initiating terminal ITFa1, to a second initiating terminal ITF2 for continuously playing, and sends a state notification about transferring the played session content from the first initiating terminal ITFa1 to the second initiating terminal ITF2. The network side receives a session content transfer message from ITFa1, and transfers the session content from the first initiating terminal ITFa1 to the second initiating terminal ITF2 for playing, and sends a state notification about transferring the played session content from the first initiating terminal ITFa1 to the second initiating terminal ITF2, where the state notification carries indication information for continuing to share the session content played on ITFa2.

In step S830, the network side receives the state notification about transferring the played session content from the first initiating terminal ITFa1 to the second initiating terminal ITF2, and according to the state notification, ends the share session or continues to share the session content continuously played on the second initiating terminal. In Embodiment 3, the network side continues to share the session content played on ITFa2. As shown in FIG. 9A and FIG. 9B, steps 906 to 911 and basically the same as steps 706 to 701 in FIG. 7A and FIG. 7B, but steps 901 to 905 are different from steps 701 to 705 in FIG. 7A and FIG. 7B. Specifically step S810 is different from step S610 in the following:

Step S810 includes:
901. User A uses a terminal device ITFa1 to watch CoD media content.

902. User A uses a terminal device ITFa2 to send an Invite message to a content share application server (content share AS), where the message carries an indication indicating that the CoD media content being watched on the terminal device ITFa1 is shared.

903. The content share application server (content share AS) sends a subscription message to an IPTV control (IPTV control) device, subscribing to the content being watched on the terminal device ITFa1.

904. The IPTV control (IPTV control) device notifies the content share application server (content share AS) of the content information of the CoD currently watched on ITFa1 (for example, Bookmark information including includes a content identifier and the currently watched program position).

905. The content share application server (content share AS) sends an Invite message to the terminal ITFb of user B, initiating a content share session invitation.

When or before or after receiving a response from the ITFb terminal, the content share application server (content share AS) controls the corresponding media resource function processor (Media Resource Function processor, "MRFP") to access, according to the content information of the CoD currently watched on ITFa1 (for example, Bookmark information including a content identifier and the currently watched program position), the CoD media content currently watched on ITFa1, and after receiving a response (200 ok) from the ITFb terminal, forwards the CoD media (RTP stream in FIG. 9A and FIG. 9B) to the ITFb.

Other steps S820 and S830 in Embodiment 3 are basically the same as steps S620 and S630 in Embodiment 2, and are not further described here, where step S820 includes steps 906*a* to 906*b*, while step S830 includes steps 907 to 911.

Because the content share session in Embodiment 3 is initiated by ITFa2, no content share session transfer occurs (transfer from ITFa1 to ITFa2). Therefore, in an exemplary embodiment, ITFa2 notifies, through a re-invite message, the Content share AS that the AS content source is changed, that is, ITFa1 is changed to ITFa2.

Figure 10A:
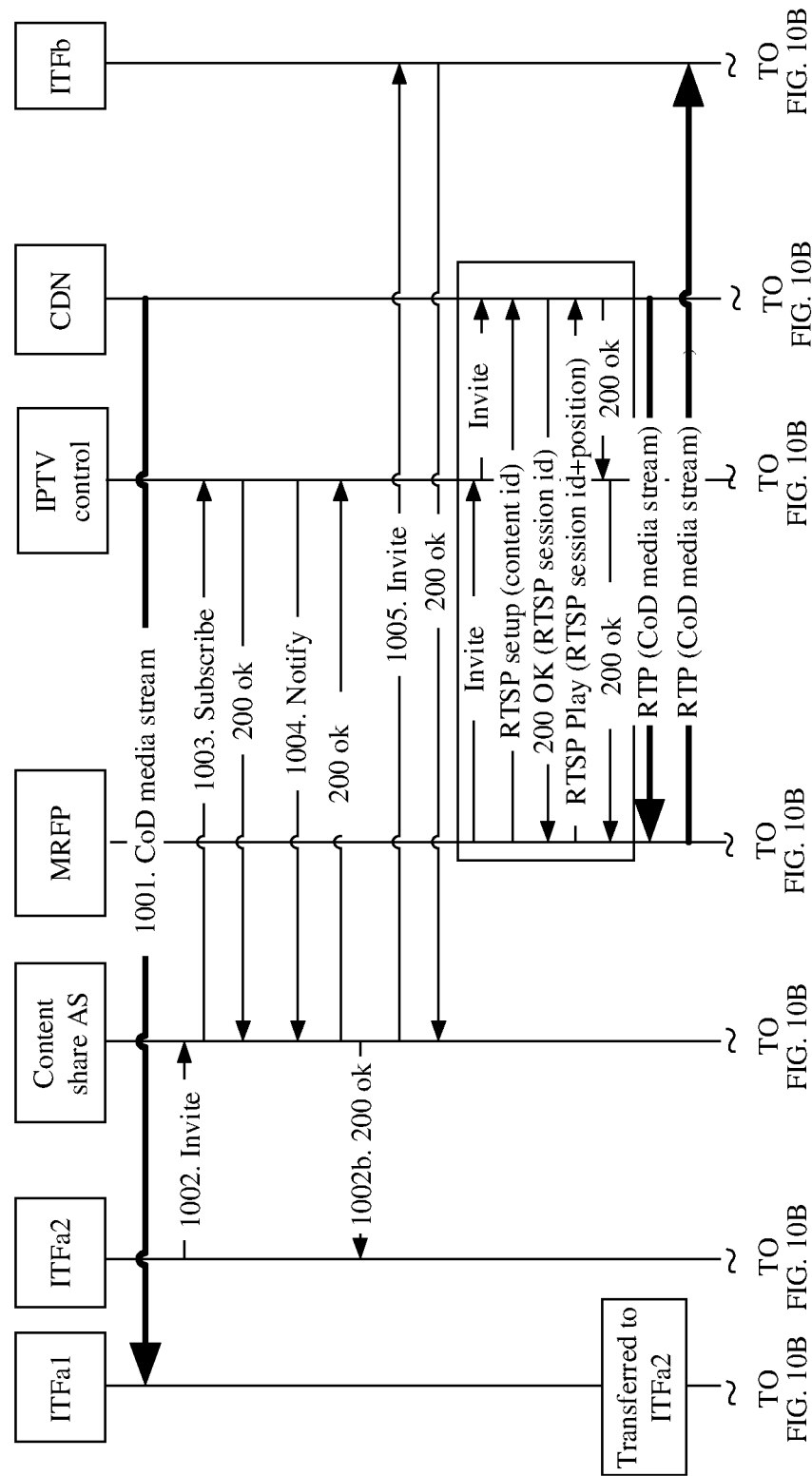
FIG. 10A and FIG. 10B are a time sequence diagram of an embodiment further improved based on the embodiment shown in FIG. 9A and FIG. 9B.
Figure 10B:
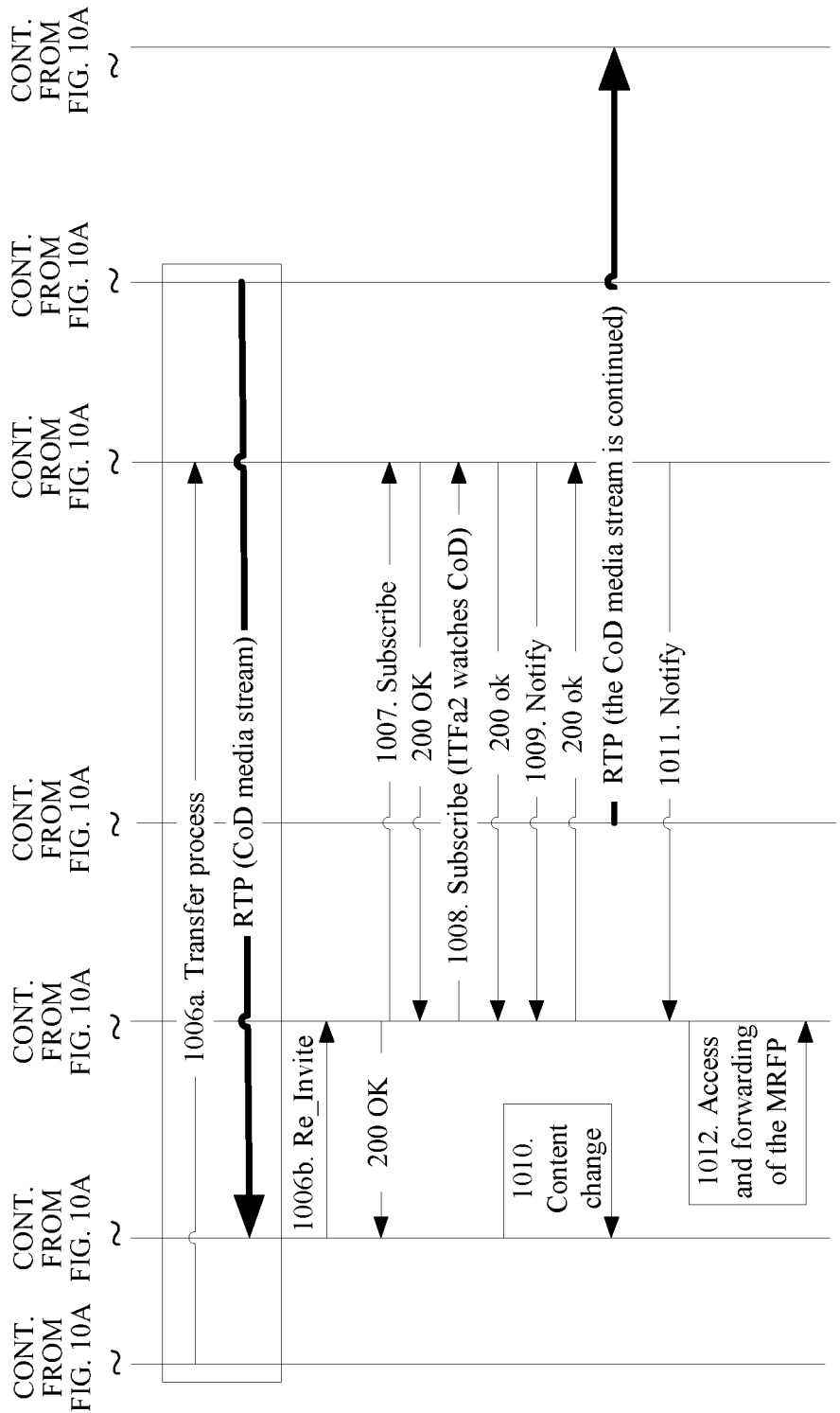

FIG. 10A and FIG. 10B show a time sequence diagram of the exemplary embodiment. Steps 1001 to 1005 included in the embodiment shown in FIG. 10A and FIG. 10B are basically similar to steps 901 to 905 in the embodiment shown in FIG. 9A and FIG. 9B. The following specifically describes the difference between the embodiment shown in FIG. 10A and FIG. 10B and the embodiment shown in FIG. 9A and FIG. 9B. The embodiment shown in FIG. 10A and FIG. 10B includes:

1006*a*. Perform session transfer, and the content watched on ITFa1 is transferred to ITFa2. Afterward, user A uses ITFa2 to watch the CoD content (as shown in FIG. 2, the RTP stream is directed to ITFa2).

1006*b*. ITFa2 sends a Re-invite message to the Content Share AS, indicating that the media content on ITFa2 continues to be shared.

Step S9030 may include:
1007. The Content share AS subscribes to the content played on ITFa1 from the IPTV Control, where the subscription message carries an identifier with the validity time being 0 (expire=0), that is, quitting the subscription to ITFa1.

1008. The content share AS sends a subscription message to the IPTV control, subscribing to the content being watched on the terminal device ITFa2.

1009. The IPTV control notifies the content share AS of the content information of CoD currently watched on ITFa2 (for example, Bookmark information that includes a content identifier and the currently watched program position); according to the normal scenario setting of session transfer, in the process, content of ITFa2 and ITFa1 is continuous. Therefore, in the process, no change occurs when the MRFP accesses the media or shares the media with the peer.

1010. A content change operation occurs on ITFa2 (for example, the user performs channel switching).

1011. The IPTV control notifies the content share AS of the content information currently watched on ITFa2 (Bookmark information including a content identifier and the currently watched program position when CoD, and the channel number when Schedule).

1012. The content share AS controls the corresponding media resource function processor MRFP to access, according to the content information currently watched on ITFa2 after the change (for example, Bookmark information including a content identifier and the currently watched program position when CoD, and the channel number when Schedule), the media stream, and forwards the content information to the peer (ITFb).

In the embodiment shown in FIG. 10A and FIG. 10B, the SIP REFER message may not be extended, but the content on ITFa2 continues to be shared by default.

Figure 11A:
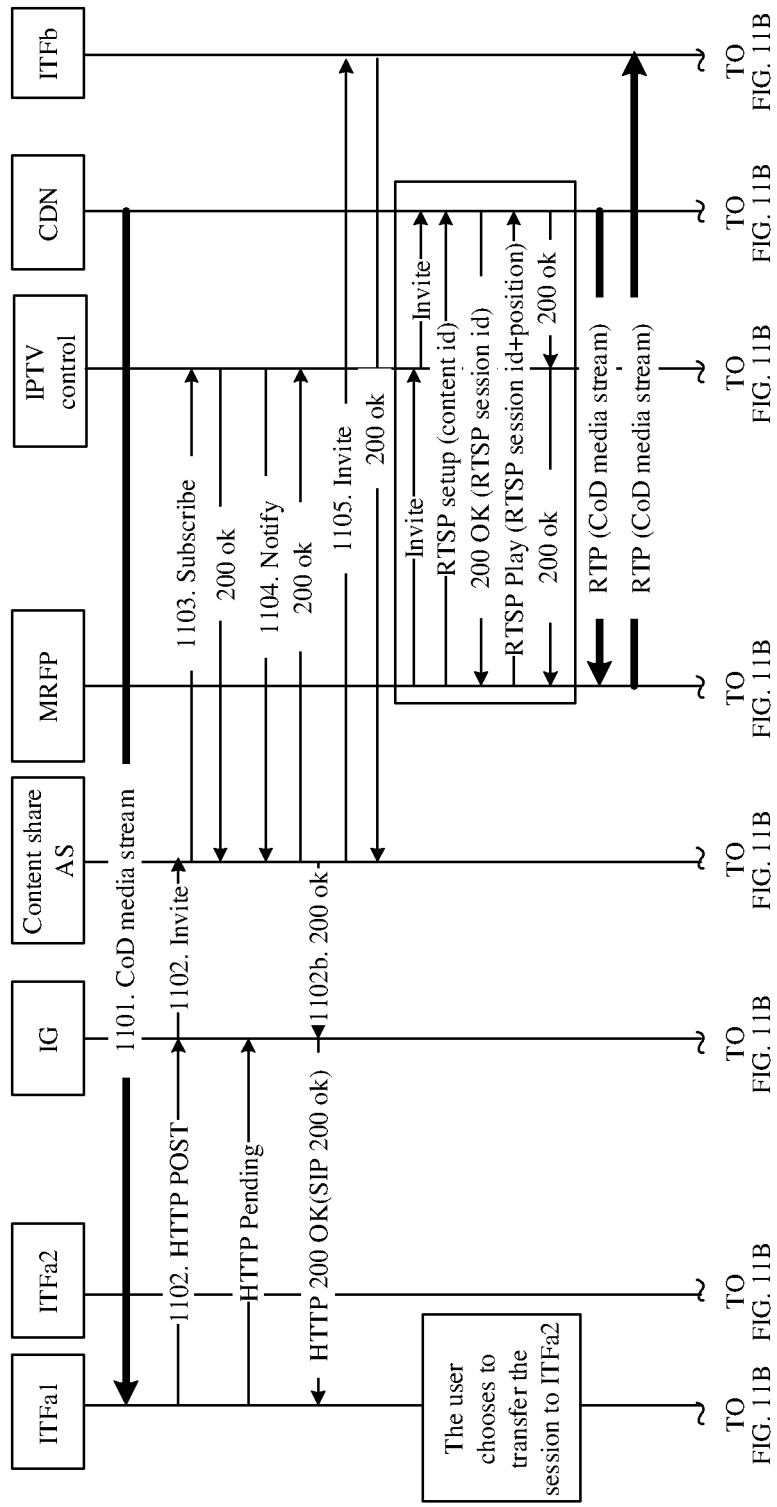
FIG. 11A and FIG. 11B are a time sequence diagram of Embodiment 4 of the present invention.
Figure 11B:
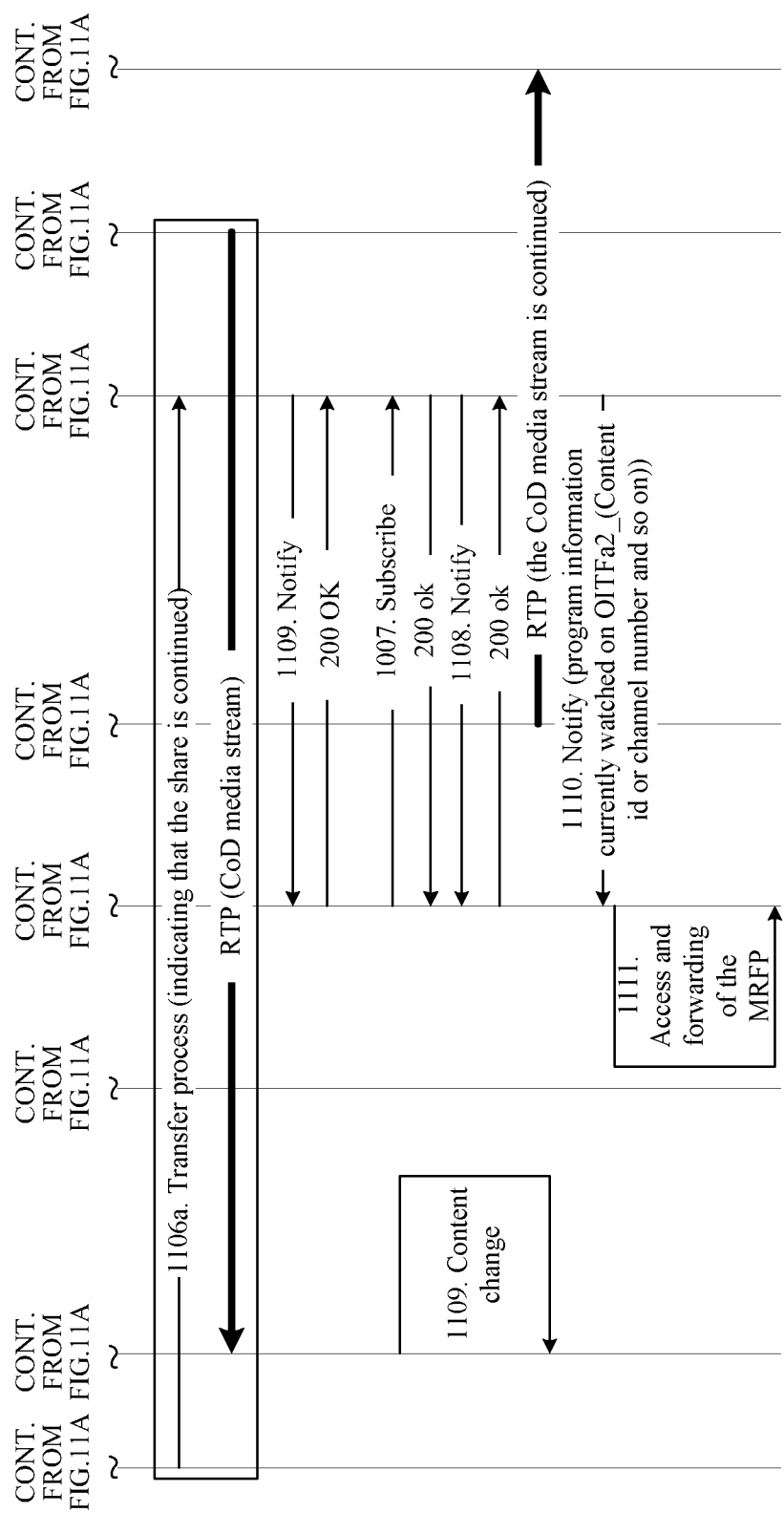

FIG. 11A and FIG. 11B show a time sequence diagram of Embodiment 4 of the present invention. In Embodiment 4, OITFa1 and OITFa2 are located in a same IG; the content share implementation is similar to those in Embodiment 1 to Embodiment 3, but the interaction process between the OITF and the IG is added. The following specifically describes Embodiment 4:

1101. User A uses a terminal OITFa1 to watch CoD media content.

1102. User A uses terminal OITFa1 to send an HTTP POST message to an IG, indicating that the media content on OITFa1 is shared, and the IG forwards the Invite message to the content share AS.

1103. The content share AS sends a subscription message to the IPTV control, subscribing to the content being watched on the terminal device OITFa1.

1104. The IPTV control notifies the content share AS of the content information of the CoD currently watched on OITFa1 (for example, Bookmark information including a content identifier and the currently watched program position). The Content share AS returns a 200 ok to the IG, and the IG returns an HTTP 200 OK to OITFa1.

1105. The content share AS sends an Invite message to the terminal ITFb of user B, and initiates a content share session invitation. When or before or after receiving the response of the ITFb terminal, the content share AS controls the corresponding MRFP to access, according to the content information of the CoD currently watched on OITFa1 (for example, Bookmark information including a content identifier and the currently watched program position), the CoD media content currently watched on OITFa1, and after receiving a response (200 ok) from the ITFb terminal, forwards the CoD media (RTP stream in FIG. 11A and FIG. 11B) to the ITFb.

1106a. Perform session transfer, and the content watched on OITFa1 is transferred to OITFa2, and it is indicated, in the transfer process, that the media content watched on OITFa2 continues to be shared; afterward, user A uses OITFa2 to watch CoD content (as shown in FIG. 11A and FIG. 11B, the RTP stream is directed to ITFa2).

1106b. The IPTV control notifies the content share AS that the content on OITFa1 is transferred and that the content on OITFa2 continues to be shared.

1107. The content share AS sends a subscription message to the IPTV control, subscribing to the content being watched on the terminal device OITFa2.

1108. The IPTV control notifies the content share AS of the content information of CoD currently watched on OITFa2 (for example, Bookmark information including a content identifier and the currently watched program position); according to the normal scenario setting of session transfer, in the process, content of OITFa2 and OITFa1 is continuous. Therefore, in the process, no change occurs when the MRFP accesses the media or shares the media with the peer.

1109. A content change operation occurs on OITFa2 (for example, the user performs channel switching).

1110. The IPTV control notifies the content share AS of the content information currently watched on OITFa2 (for example, Bookmark information including a content identifier and the currently watched program position when CoD, and the channel number when Schedule).

1111. The content share AS controls the corresponding media resource function processor MRFP to access, according to the content information currently watched on OITFa2 after the change (for example, Bookmark information including a content identifier and the currently watched program position when CoD, and the channel number when Schedule), the media stream, and forwards the content information to the peer (ITFb).

Figure 12A:
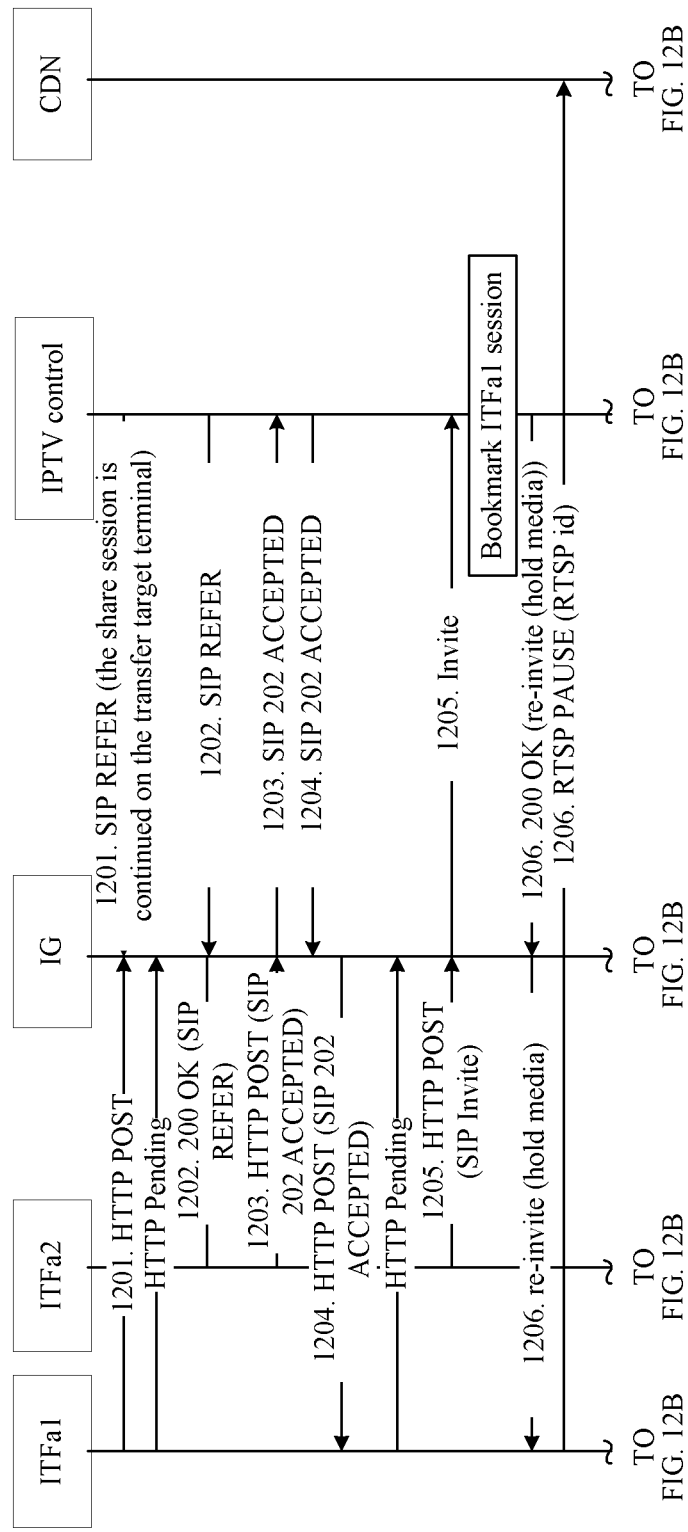
FIG. 12A and FIG. 12B are a time sequence diagram of transferring content from ITFa1 to ITFa2 by using a SIP REFER message in Embodiment 4 shown in FIG. 11A and FIG. 11B.
Figure 12B:
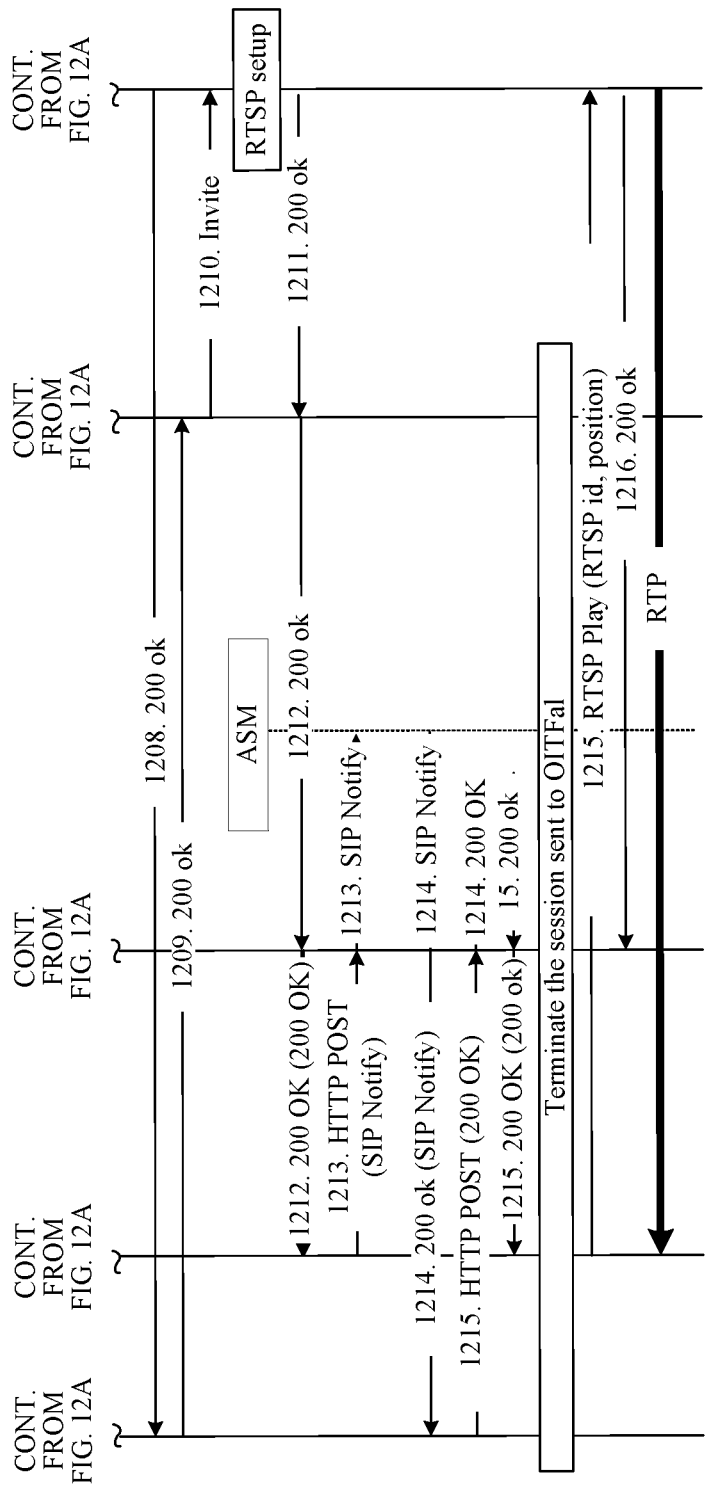

FIG. 12A and FIG. 12B show a process of transferring content from ITFa1 to ITFa2 by using a SIP REFER message in Embodiment 4 shown in FIG. 11A and FIG. 11B. The process shown in FIG. 12A and FIG. 12B is similar to the process shown in FIG. 5, and the difference lies in that the interaction with the IG is added.

As shown in FIG. 3, before the transfer, all registered devices of the user need to be discovered by using a 3GPP dynamic device discovery process. The specific time sequence diagram of the 3GPP dynamic device discovery process is described above in FIG. 3, and is not further described here.

Specifically, the transfer process in FIG. 12A and FIG. 12B includes:

1201. OITFa1 sends an HTTP POST message to an IG, where the message carries a SIP REFER message; the IG forwards the SIP REFER message to the IPTV Control, where the SIP REFER message is extended to indicate that content continues to be shared on a new terminal.

1202. The IPTV Control sends the SIP REFER message to the IG, and the IG forwards the SIP REFER message to OITFa2.

1203. ITFa2 returns a SIP 202 ACCEPTED message to the IG, and the IG returns the SIP 202 ACCEPTED message to the IPTV Control.

1204. The IPTV Control forwards the SIP 202 ACCEPTED to the IG, and the IG forwards the SIP 202 ACCEPTED to OITFa1.

1205. OITFa2 sends an HTTP POST message to the IG, where the message carries a SIP Invite message, and the IG forwards the Invite message to the IPTV Control.

1206. The IPTV Control sends a re-invite message to the IG to hold the media, and the IG returns a 200 OK message to OITFa1, where the message carries the re-invite message to hold the media.

1207. OITFa1 sends an RTSP PAUSE message to a CDN (content delivery network), where the message carries an RTSP id.

1208. The CDN returns a 200 ok message.

1209. OITFa1 forwards the 200 ok message to the IPTV Control.

1210. The IPTV Control sends an Invite message to the CND.

1211. The CDN returns a 200 ok message.

1212. The IPTV Control returns a 200 ok to the IG, and the IG forwards a 200 OK to OITFa2.

1213. OITFa2 sends an HTTP POST message to the IG, where the message carries a SIP Notify notification, and the IG forwards the SIP Notify notification to the ASM.

1214. The ASM sends a SIP Notify to the IG; the IG returns a 200 ok carrying the SIP Notify notification to OITFa1; OITFa1 sends an HTTP POST message to the IG, where the message carries a 200 OK message, and the IG forwards the 200 OK message to the ASM.

1215. The ASM returns a 200 OK message to the IG; the IG forwards the 200 OK message to the OITFa2; OITFa2 sends an RTSP Play message to the CDN, where the message carries an RTSP id and a position identifier.

1216. The CDN returns a 200 ok message to the IG.

In the embodiment shown in FIG. 12A and FIG. 12B, other SIP messages also need to be forwarded by the ASM. Those skilled in the art may understand the forwarding process.

Figure 13:
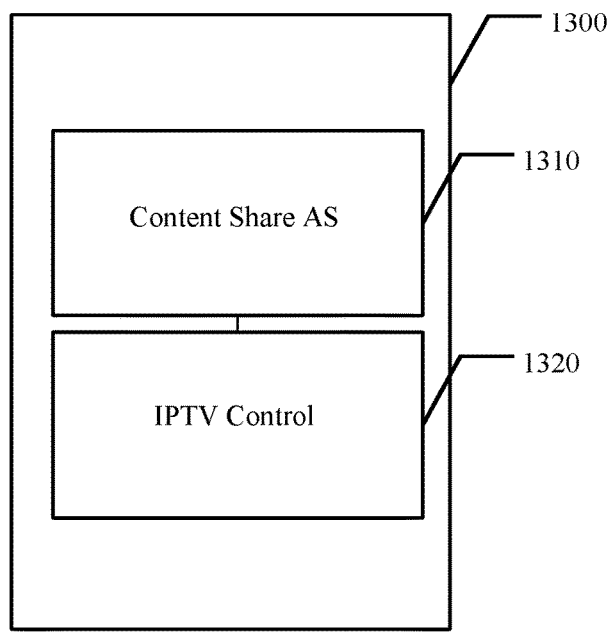
FIG. 13 is a block diagram of an embodiment of a system for content sharing according to an embodiment of the present invention.

FIG. 13 shows an embodiment of a system 1300 for implementing a method for content sharing according to the present invention. The system 1300 includes: a Content share AS 1310, configured to receive a content share request, establish a share session with a receiving terminal, and share session content, which is played on a first initiating terminal ITFa1, with the receiving terminal; and an IPTV Control device 1320, configured to transfer the session content, which is played on the first initiating terminal ITFa1, to a second initiating terminal ITF2 for continuously playing, and send a state notification about transferring the played session content from the first initiating terminal ITFa1 to the second initiating terminal ITF2; where the Content share AS 1310 is configured to receive the state notification about transferring the played session content from the first initiating terminal ITFa1 to the second initiating terminal ITF2, and according to the state notification, end the share session or continue to share the session content continuously played on the second initiating terminal ITF2.

For Embodiment 1 and Embodiment 2 of the present invention, the Content share AS 1310 may receive a content share Invite request message from ITFa1, where the request message carries an indication indicating that the session content played on the first initiating terminal ITFa1 is requested to be shared.

For Embodiment 3 of the present invention, the Content share AS 1310 may receive a content share Invite request message from ITFa2, where the request message carries an indication indicating that the session content played on the first initiating terminal ITFa1 is requested to be shared.

Figure 14:
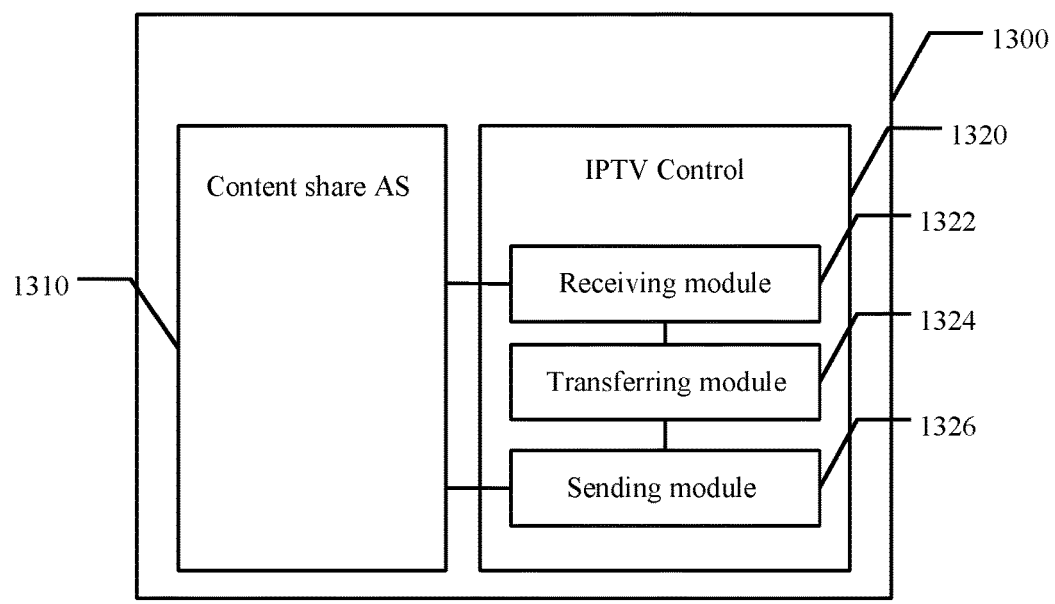
FIG. 14 is a block diagram of an embodiment of a system for content sharing according to an embodiment of the present invention.

According to an embodiment of the present invention, as shown in FIG. 14, the IPTV Control device 1320 may include: a receiving module 1322, configured to receive a request message for transferring the played session content from the first initiating terminal ITFa1 to the second initiating terminal ITF2; a transferring module 1324, configured to receive the request message sent by the receiving module 1322, and transfer the session content, which is played on the first initiating terminal ITFa1, to the second initiating terminal ITF2 for continuously playing; and a sending module 1326, configured to send, to the Content share AS 1310, the state notification about transferring the played session content from the first initiating terminal ITFa1 to the second initiating terminal ITF2.

According to an embodiment of the present invention, the receiving module 1322 is configured to receive, from the first initiating terminal ITFa1, a request message for transferring the played session content from the first initiating terminal ITFa1 to the second initiating terminal ITF2.

According to an embodiment of the present invention, the Content share AS 1310 is further configured to send, to the IPTV Control device 1320, a subscription request for subscribing to the state of the content played on the first initiating terminal ITFa1; the sending module 1326 is configured to send, to the Content share AS 1310 according to the subscription request of the Content share AS 1310, the information of the content played on the first terminal ITFa1, so that the Content Share AS 1310 establishes a share session with the receiving terminal ITFb according to the information of the content played on the first initiating terminal ITFa1 and shares the session content, which is played on the first initiating terminal ITFa1, with the receiving terminal ITFb.

According to an embodiment of the present invention, the request message received by the receiving module 1322 carries indication information for ending the share session, and the sending module 1326 is specifically configured to send, to the Content share AS 1310, a state notification carrying the indication information for ending the share session; the Content share AS 1310 is configured to end the share session with the receiving terminal ITFb according to the state notification carrying the indication information for ending the share session.

According to an embodiment of the present invention, the request message received by the receiving module 1322 carries the state message of the indication information for continuing to share the session content played on the second initiating terminal ITFa2; the sending module 1326 is specifically configured to send, to the Content share AS 1310, the state notification carrying the indication information for continuing to share the session content played on the second initiating terminal ITFa2; and the Content share AS 1310 is configured to continue to share, according to the state notification carrying the indication information for continuing to share the session content played on the second initiating terminal ITFa2, the session content played on the second initiating terminal ITFa2.

According to an embodiment of the present invention, the Content share AS 1310 is further configured to send, to the IPTV Control device 1320, a subscription request for subscribing to the state of the content played on the second initiating terminal ITFa2; the sending module 1326 is configured to send, to the Content share AS 1310 according to the subscription request of the Content share AS 1310, the information of the content played on the second terminal ITFa2, so that the Content Share AS 1310 establishes a share session with the receiving terminal ITFb according to the information of the content played on the second initiating terminal ITFa2 and shares the session content, which is played on the second initiating terminal ITFa2, with the receiving terminal ITFb.

According to an embodiment of the present invention, the receiving module 1322 is configured to receive a SIP REFER message from the first initiating terminal ITFa1; the transferring module 1324 transfers the played session content from the first initiating terminal ITFa1 to the second initiating terminal ITFa2 according to the SIP REFER message, where the SIP REFER message carries indication information for ending the share session or continuing to share the session content played on the second initiating terminal ITFa2.

Figure 15:
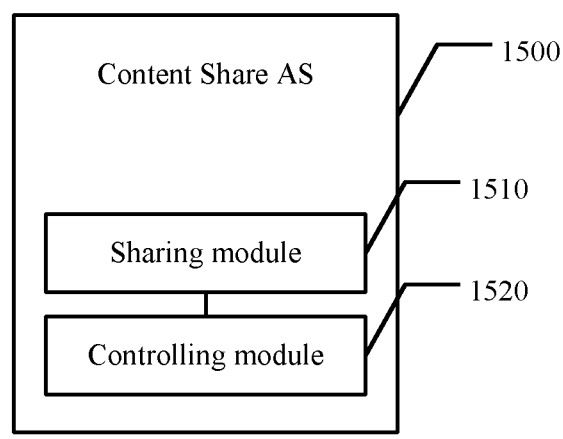
FIG. 15 is a block diagram of a content share application server according to an embodiment of the present invention.

FIG. 15 is a structural block diagram of a Content Share AS of a system for content sharing according to an embodiment of the present invention. As shown in FIG. 15, the Content Share AS 1500 may include: a sharing module 1510, configured to receive a content share request, establish a share session with a receiving terminal ITFb, and share session content, which is played on a first initiating terminal ITFa1, with the receiving terminal ITFb; and a controlling module 1520, configured to receive a state notification about transferring the played session content from the first initiating terminal ITFa1 to the second initiating terminal ITF2, and according to the state notification, end the share session or continue to share the session content, which is continuously played on the second initiating terminal ITFa1, with the receiving terminal ITFb.

According to an embodiment of the present invention, the content share request message received by the sharing module 1510 comes from the first initiating terminal ITFa1 or the second initiating terminal ITFa2, where the request message carries an indication indicating that the session content played on the first initiating terminal ITFa1 is requested to be shared.

According to an embodiment of the present invention, the sharing module 1510 is specifically configured to: receive the content share request, and subscribe to, from an IPTV control device, information of the content played on the first initiating terminal; forward the share request to the receiving terminal to request to establish the share session; and access, according to the information of the content played on the first initiating terminal, which is sent by the IPTV device, the session content played on the first initiating terminal, and forward, through the share session, the session content played on the first initiating terminal to the receiving terminal.

According to an embodiment of the present invention, the controlling module 1520 is a first controlling module, configured to receive, from the IPTV Control, the state notification carrying indication information for ending the share session, and end the share session with the receiving terminal according to the state notification carrying the indication information for ending the share session.

According to an embodiment of the present invention, the controlling module 1520 is a second controlling module, configured to receive, from the IPTV Control, the state notification carrying indication information for continuing to share the session content played on the second initiating terminal ITFa2, and according to the state notification carrying the indication information for continuing to share the session content played on the second initiating terminal ITFa2, continue to share the session content played on the second initiating terminal ITFa2.

According to an embodiment of the present invention, the second controlling module is specifically configured to: receive, from the Internet Protocol Television control device, the state notification carrying indication information for continuing to share the session content played on the second initiating terminal, and subscribe to information of the content, which is played on the second initiating terminal, from the IPTV control device according to the indication information for continuing to share the session content played on the second initiating terminal; and access, according to the information of the content played on the second initiating terminal, which is sent by the IPTV device, the session content played on the second initiating terminal, and forward, to the receiving terminal through the share session, the session content played on the second initiating terminal.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

The steps of a method or algorithm described in connection with the embodiments disclosed here may be embodied in hardware, in a software module performed by a processor, or in a combination of the two. The software module may be located in a Random Access Memory (RAM), an internal memory, a Read Only Memory (ROM), an Electrically Programmable Read Only Memory (EPROM), an Electrically Erasable Programmable Read Only Memory (EEPROM), a register, a hard disk, a removable disk, a Compact Disk-Read Only Memory (CD-ROM), or any other storage media well-known in the art.

Although some embodiments of the present invention are shown and described, persons skilled in the art should understand that, various modifications may be performed on these embodiments without departing from the principle and the spirit of the present invention, as long as such modifications should fall within the scope of the present invention.

What is claimed is:

1. A method for content sharing, comprising:
receiving a content share request, establishing a share session with a receiving terminal to share session content played on a first initiating terminal with the receiving terminal;
receiving a state notification about transferring the played session content from the first initiating terminal to a second initiating terminal, the state notification indicating whether to end the share session or continue to share the session content which is played on the second initiating terminal and, according to the state notification, ending the share session or continuing to share the session content, which is played on the second initiating terminal, with the receiving terminal; and
transferring the played session content from the second initiating terminal to the receiving terminal that previously shared the session content played by the first initiating terminal when the state notification indicates continuing to share the session content.

2. The method according to claim 1, wherein the receiving a content share request, establishing a share session with a receiving terminal to share session content, which is played on a first initiating terminal, with the receiving terminal comprise:
receiving the content share request, and subscribing to, from an IPTV control device, information of the content played on the first initiating terminal;
forwarding the share request to the receiving terminal to request to establish the share session; and accessing, according to the information of the content played on the first initiating terminal, which is sent by the IPTV control device, the session content played on the first initiating terminal, and forwarding, to the receiving terminal through the share session, the session content played on the first initiating terminal.

3. The method according to claim 1, wherein the state notification indicates ending the share session; and
the according to the state notification, ending the share session or continuing to share the session content, which is played on the second initiating terminal, with the receiving terminal comprises:
ending the share session according to the indication ending the share session.

4. The method according to claim 1, wherein the state notification indicates continuing to share the session content played on the second initiating terminal; and
the according to the state notification, ending the share session or continuing to share the session content played on the second initiating terminal comprises:
continuing to share, with the receiving terminal according to the indication continuing to share the session content played on the second initiating terminal, the session content played on the second initiating terminal.

5. The method according to claim 4, wherein the continuing to share, with the receiving terminal according to the indication information for continuing to share the session content played on the second initiating terminal, the session content played on the second initiating terminal comprises:
subscribing to, from the IPTV control device, information of the content played on the second initiating terminal; and
accessing, according to the information of the content played on the second initiating terminal, which is sent by the IPTV control device, the session content played on the second initiating terminal, and forwarding, to the receiving terminal through the share session, the session content played on the second initiating terminal.

6. The method according to claim 1, wherein the state notification is a SIP REFER message which is extended to indicate ending share or continuing to share the session content played on the second initiating terminal.

7. A system for content sharing, comprising:
a memory; and
a processor coupled to the memory and configured to:
receive a content share request and establish a share session with a receiving terminal to share session content, which is played on a first initiating terminal, with the receiving terminal;
transfer the session content, which is played on the first initiating terminal, to a second initiating terminal for playing, and send a state notification about transferring the played session content from the first initiating terminal to the second initiating terminal, the state notification indicating whether to end the share session or continue to share the session content which is played on the second initiating terminal;
receive the state notification about transferring the played session content from the first initiating terminal to the second initiating terminal, and according to the state notification, end the share session or continue to share the session content, which is continuously played on the second initiating terminal, with the receiving terminal; and
transfer the played session content from the second initiating terminal to the receiving terminal that previously shared the session content played by the first initiating terminal when the state notification indicates continuing to share the session content.

8. The system according to claim 7, wherein the processor is further configured to:
receive a request message for transferring the played session content from the first initiating terminal to the second initiating terminal;
just receive the request message sent by the receiver, and transfer the session content, which is played on the first initiating terminal, to the second initiating terminal for playing; and
send, to a content share application server, the state notification about transferring the played session content from the first initiating terminal to the second initiating terminal.

9. The system for content sharing according to claim 7, wherein the content share request message comes from the first initiating terminal or the second initiating terminal and the request message indicates that the session content played on the first initiating terminal is requested to be shared.

10. The system for content sharing according to claim 8, wherein the receiver is specifically configured to receive the request message which comes from the first initiating terminal and is used for transferring the played session content from the first initiating terminal to the second initiating terminal.

11. The system for content sharing according to claim 8, wherein the processor is further configured to:
send, to an Internet Protocol Television control device, a subscription request for subscribing to a state of the content played on the first initiating terminal; and
send, to the content share application server according to the subscription request of the content share application server, information of the content played on the first initiating terminal, so that the content share application server establishes the share session with the receiving terminal according to the information of the content played on the first initiating terminal and shares the session content, which is played on the first initiating terminal, with the receiving terminal.

12. The system for content sharing according to claim 8, wherein the request message received by the receiver indicates ending the share session;
the sender is specifically configured to send, to the content share application server, the state notification indicating ending the share session; and
the content share application server is configured to end the share session with the receiving terminal according to the state notification indicating ending the share session.

13. The system for content sharing according to claim 8, wherein the request message received by the receiver indicates continuing to share the session content played on the second initiating terminal;
the sender is specifically configured to send, to the content share application server, the state notification indicating continuing to share the session content played on the second initiating terminal; and
the content share application server is configured to continue to share, according to the state notification indicating continuing to share the session content played on the second initiating terminal, the session content played on the second initiating terminal.

14. The system for content sharing according to claim 13, wherein the content share application server is further configured to send, to an Internet Protocol Television control device, a subscription request for subscribing to a state of the content played on the second initiating terminal; and the sender is further configured to send, to the content share application server according to the subscription request of the content share application server, information of the content played on the second initiating terminal, so that the content share server shares, with the receiving terminal according to the information of the content played on the second initiating terminal, the session content played on the second initiating terminal.

15. The system for content sharing according to claim 8, wherein the receiver is specifically configured to receive a SIP REFER message from the first initiating terminal, and the transferor is specifically configured to transfer the played session content from the first initiating terminal to the second initiating terminal according to the SIP REFER message.

16. The system for content sharing according to claim 15, wherein the SIP REFER message received by the receiver carries indication information for ending the share session or continuing to share the session content played on the second initiating terminal.

17. A content share application server, comprising:
a distributor running on a processor coupled to a memory, the distributor configured to receive a content share request, establish a share session with a receiving terminal, to share session content which is played on a first initiating terminal, with the receiving terminal;
a controller running on the processor, the controller configured to receive a state notification about transferring the played session content from the first initiating terminal to a second initiating terminal, the state notification indicating whether to end the share session or continue to share the session content which is played on the second initiating terminal and, according to the state notification, end the share session or continue to share the session content, which is played on the second initiating terminal, with the receiving terminal; and
the controller is further configured to transfer the played session content from the second initiating terminal to the receiving terminal that previously shared the session content played by the first initiating terminal when the state notification indicates continuing to share the session content.

18. The content share application server according to claim 17, wherein:
the content share request message received by the distributor comes from the first initiating terminal or the second initiating terminal, wherein the request message carries an indication indicating that the session content played on the first initiating terminal is requested to be shared.

19. The content share application server according to claim 17, wherein:
the distributor is specifically configured to: receive the content share request, and subscribe to, from an IPTV control device, information of the content played on the first initiating terminal; forward the share request to the receiving terminal to request to establish the share session; and access, according to the information of the content played on the first initiating terminal, which is sent by the IPTV control device, the session content played on the first initiating terminal, and forward, to the receiving terminal through the share session, the session content played on the first initiating terminal.

20. The content share application server according to claim 17, wherein:
the controller is specifically:
a first controller, configured to receive, from the Internet Protocol Television control device, the state notification indicating ending the share session, and end the share session with the receiving terminal according to the state notification indicating ending the share session; or
a second controller, configured to receive, from the Internet Protocol Television control device, the state notification indicating continuing to share the session content played on the second initiating terminal, and according to the state notification indicating continuing to share the session content played on the second initiating terminal, continue to share the session content played on the second initiating terminal.

21. The content share application server according to claim 20, wherein:
the second controller is specifically configured to: receive, from the Internet Protocol Television control device, the state notification indicating continuing to share the session content played on the second initiating terminal, and according to the indication continuing to share the session content played on the second initiating terminal, subscribe to, from the IPTV control device, information of the content played on the second initiating terminal; and access, according to the information of the content played on the second initiating terminal, which is sent by the IPTV control device, the session content played on the second initiating terminal, and forward, to the receiving terminal through the share session, the session content played on the second initiating terminal.

* * * * *

UNITED STATES PATENT AND TRADEMARK OFFICE
CERTIFICATE OF CORRECTION

PATENT NO. : 10,044,772 B2
APPLICATION NO. : 15/591614
DATED : August 7, 2018
INVENTOR(S) : Lei Wang et al.

Page 1 of 1

It is certified that error appears in the above-identified patent and that said Letters Patent is hereby corrected as shown below:

On the Title Page

Item [73] (Assignee):
Delete "HUAWEI DEVICE CO., LTD., Shenzhen (CN)", and insert -- HUAWEI DEVICE (SHENZHEN) CO. LTD., Shenzhen (CN) --, therefore.

Signed and Sealed this
Tenth Day of December, 2019

Andrei Iancu
*Director of the United States Patent and Trademark Office*